US012397305B2

(12) United States Patent
Endo et al.

(10) Patent No.: US 12,397,305 B2
(45) Date of Patent: Aug. 26, 2025

(54) RECTIFYING MEMBER AND NOZZLE PROVIDED WITH THE SAME

(71) Applicant: KYORITSU GOKIN CO., LTD., Hyogo (JP)

(72) Inventors: Hiroyuki Endo, Hyogo (JP); Tsuyoshi Chimoto, Hyogo (JP); Takeshi Saito, Hyogo (JP)

(73) Assignee: KYORITSU GOKIN CO., LTD., Hyogo (JP)

( * ) Notice: Subject to any disclaimer, the term of this patent is extended or adjusted under 35 U.S.C. 154(b) by 421 days.

(21) Appl. No.: 17/919,651

(22) PCT Filed: Jul. 12, 2021

(86) PCT No.: PCT/JP2021/026059
§ 371 (c)(1),
(2) Date: Oct. 18, 2022

(87) PCT Pub. No.: WO2022/030188
PCT Pub. Date: Feb. 10, 2022

(65) Prior Publication Data

US 2023/0158519 A1 May 25, 2023

(30) Foreign Application Priority Data

Aug. 4, 2020 (JP) ................................ 2020-132617

(51) Int. Cl.
*B05B 1/34* (2006.01)
*B05B 1/14* (2006.01)
*B08B 3/02* (2006.01)

(52) U.S. Cl.
CPC .............. *B05B 1/3402* (2018.08); *B05B 1/14* (2013.01); *B08B 3/02* (2013.01)

(58) Field of Classification Search
CPC ............ B05B 1/3402; B05B 1/14; B08B 3/02
(Continued)

(56) References Cited

U.S. PATENT DOCUMENTS

| | | | | | |
|---|---|---|---|---|---|
| 3,268,176 | A * | 8/1966 | O'Brien | B05B 1/14 | 239/553.5 |
| 5,878,966 | A * | 3/1999 | Asakawa | B05B 1/00 | 239/589 |

(Continued)

FOREIGN PATENT DOCUMENTS

| | | |
|---|---|---|
| CN | 101641185 | 2/2010 |
| JP | 55-27068 | 2/1980 |

(Continued)

OTHER PUBLICATIONS

Extended European Search Report issued Aug. 19, 2024 in European Patent Application No. 21853068.1.

(Continued)

*Primary Examiner* — Steven J Ganey
(74) *Attorney, Agent, or Firm* — Wenderoth, Lind & Ponack, L.L.P.

(57) ABSTRACT

A rectifying member capable of improving a collision force of a jet fluid, and a nozzle. A rectifying member includes rectifying elements each having a tubular casing and a division wall structure formed in the casing; the division wall structure includes partition walls, and has a circumferential division wall group being adjacent in a circumferential direction of an inner wall of the casing and having an extending partition wall, and an inside division wall group in an inside region of the fluid flow path.

18 Claims, 7 Drawing Sheets

(58) Field of Classification Search
USPC .................. 239/553–553.5, 589, 590–590.5
See application file for complete search history.

(56) References Cited

U.S. PATENT DOCUMENTS

| | | | | |
|---|---|---|---|---|
| 7,841,548 | B2 | 11/2010 | Fecht et al. | |
| 7,913,937 | B2 * | 3/2011 | Kioi | B05B 15/40 239/590.5 |
| 8,079,534 | B2 * | 12/2011 | Fecht | B05B 1/042 239/590.5 |
| 10,697,161 | B2 | 6/2020 | Birmelin | |
| 2005/0156064 | A1 | 7/2005 | Tanigaki et al. | |
| 2005/0247805 | A1 | 11/2005 | Grether | |
| 2010/0075579 | A1 | 3/2010 | Knisel et al. | |

FOREIGN PATENT DOCUMENTS

| | | |
|---|---|---|
| JP | 11-235539 | 8/1999 |
| JP | 2008-205059 | 9/2008 |
| JP | 2010-221257 | 10/2010 |
| JP | 2014-176884 | 9/2014 |
| JP | 5658218 | 1/2015 |
| JP | 5741886 | 7/2015 |
| JP | 6127256 | 5/2017 |
| TW | 200416077 | 9/2004 |
| WO | 2004/033108 | 4/2004 |

OTHER PUBLICATIONS

Office Action issued Mar. 12, 2024 in Taiwanese Patent Application No. 110126619, with English-language Translation.

International Search Report issued Oct. 5, 2021 in International (PCT) Application No. PCT/JP2021/026059, 2 pages.

English translation of Written Opinion of the International Searching Authority issued Feb. 16, 2023, in International Application No. PCT/JP2021/026059, with its notification, 6 pages.

* cited by examiner

[Fig. 1]
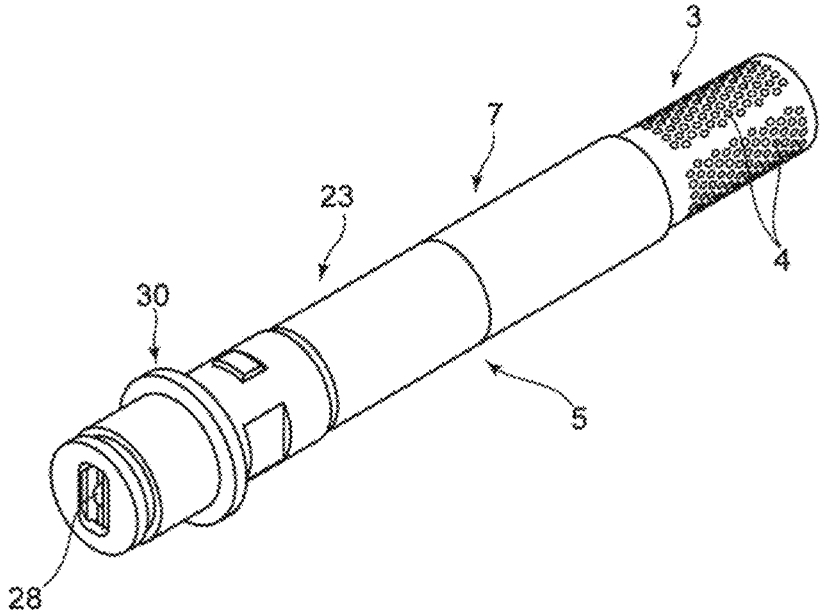

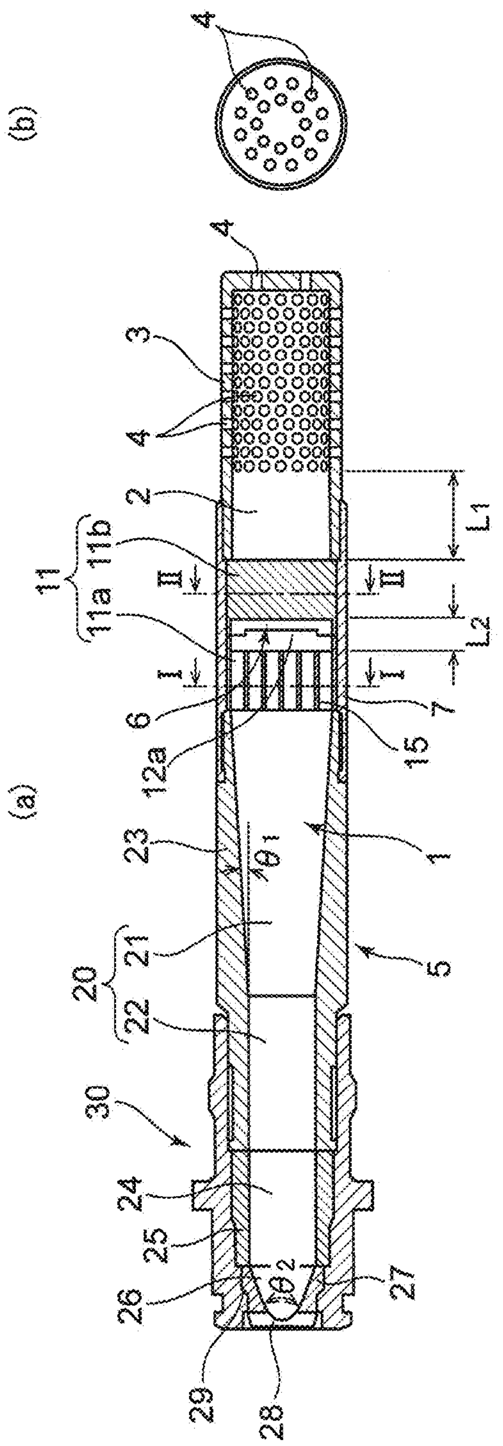
[Fig. 2]

[Fig. 3]
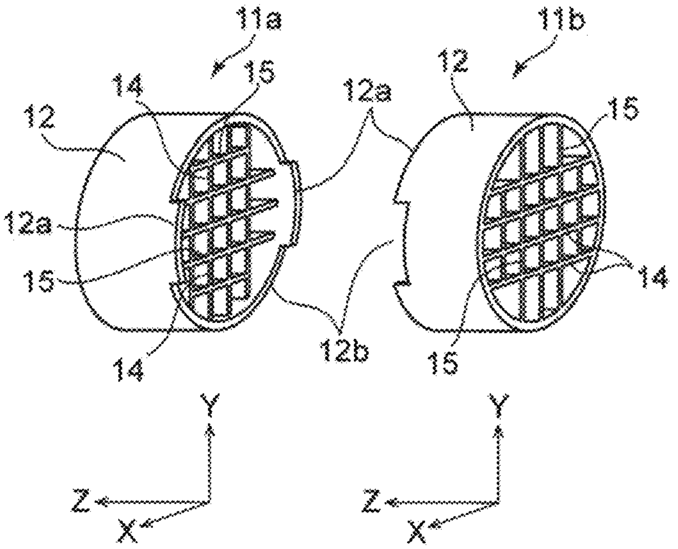
[Fig. 4]
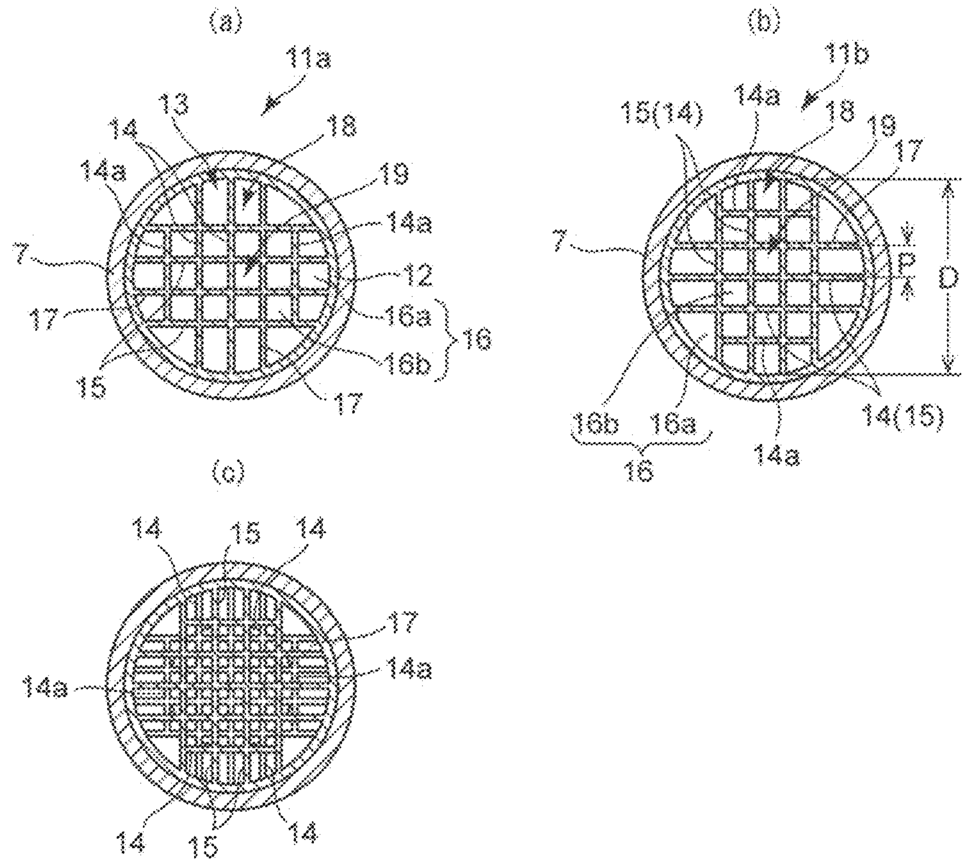

[Fig. 5]
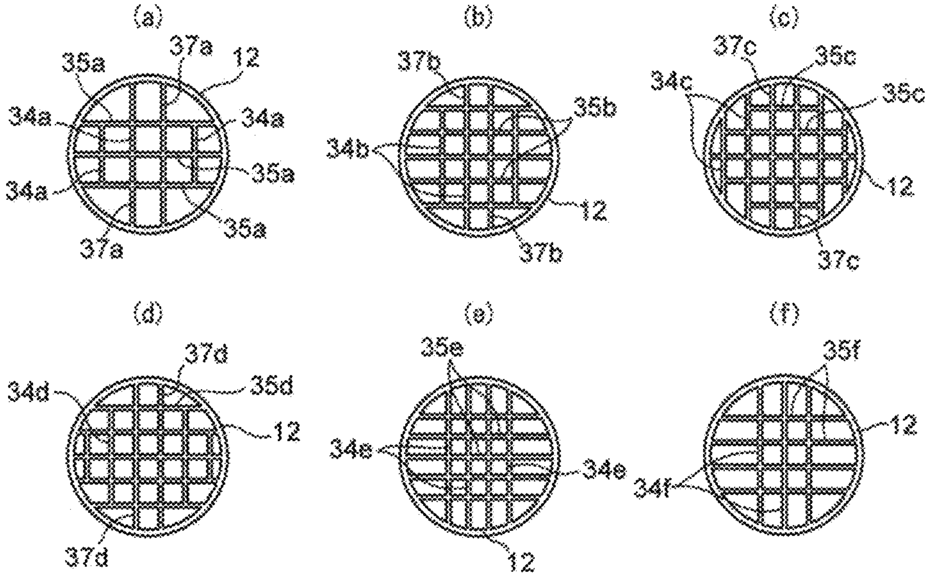
[Fig. 6]
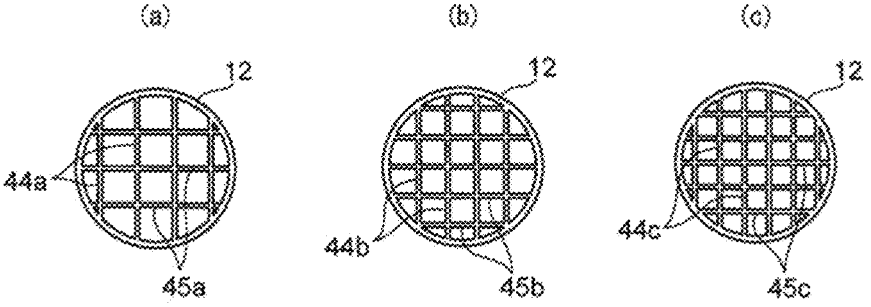
[Fig. 7]
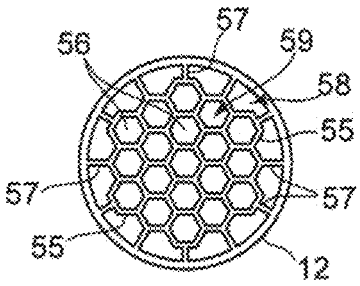

[Fig. 8]
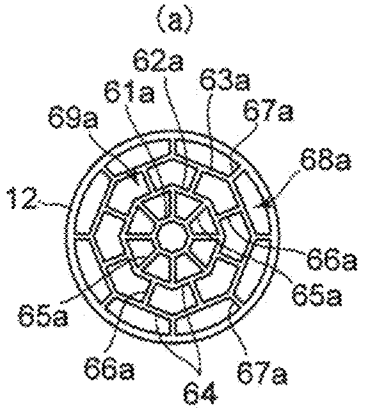
[Fig. 9]
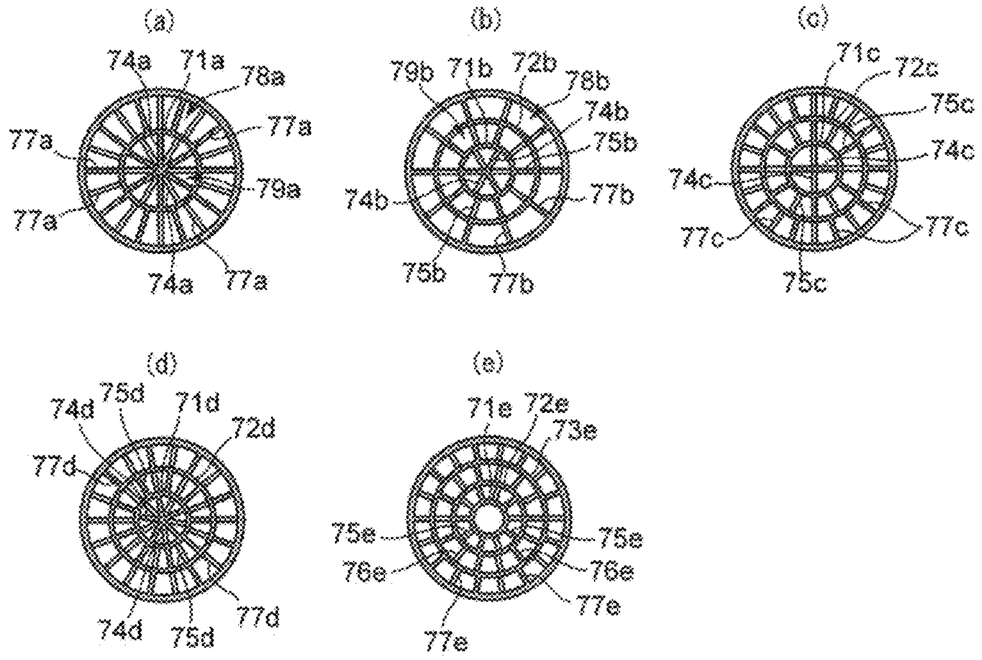

[Fig. 10]
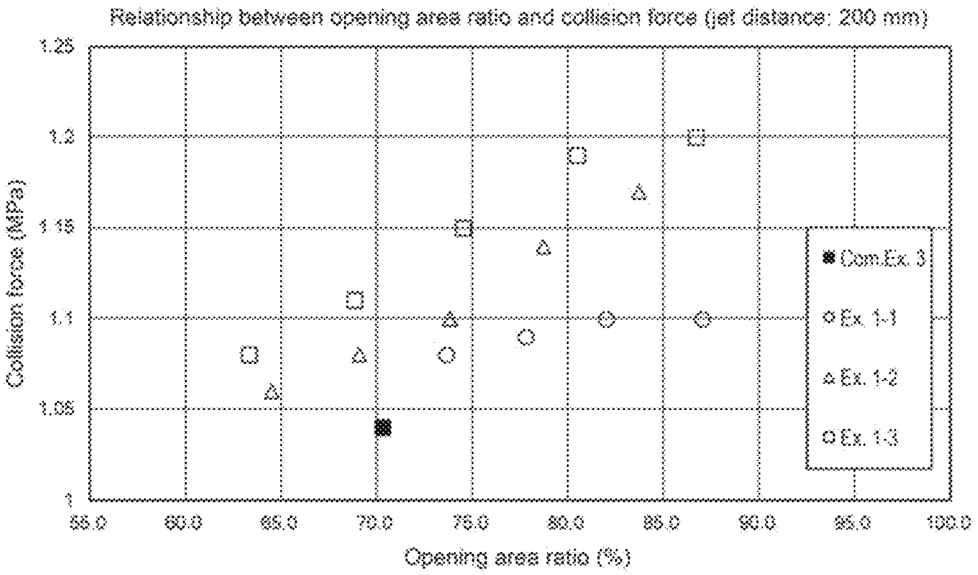
[Fig. 11]
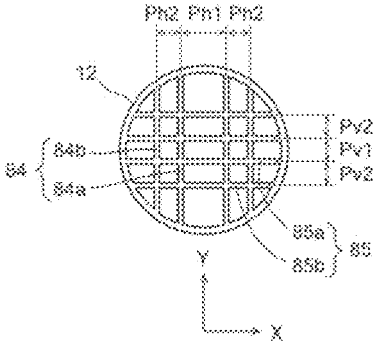
[Fig. 12]
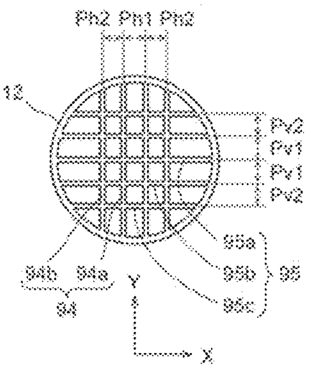

[Fig. 13]
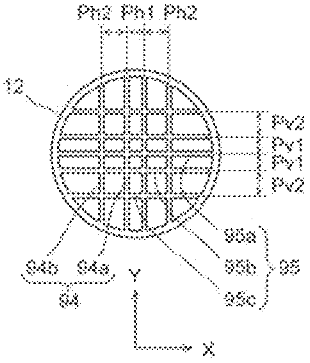
[Fig. 14]
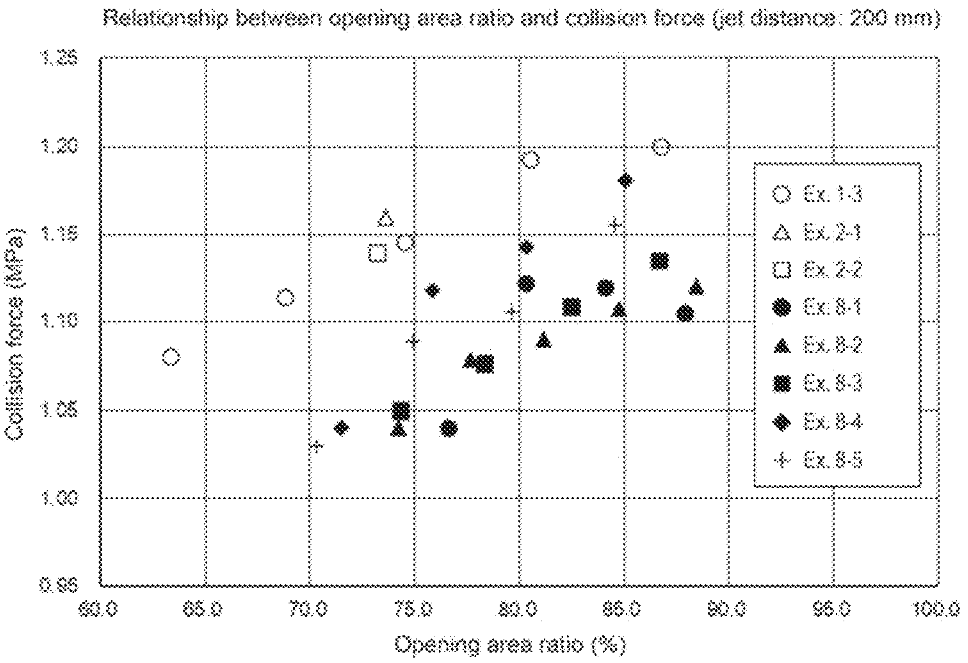
[Fig. 15]
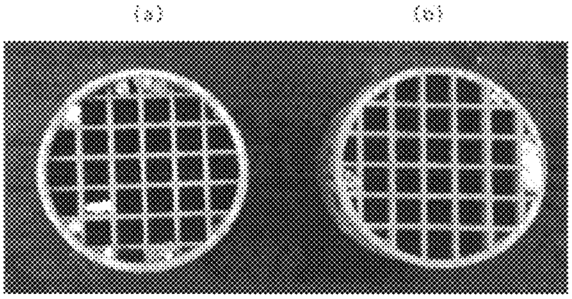

RECTIFYING MEMBER AND NOZZLE PROVIDED WITH THE SAME

TECHNICAL FIELD

The present invention relates to a rectifying member (or a rectifier) which is disposed in a flow path of a nozzle such as a descaling nozzle and is useful for rectifying a flow of a fluid, and a nozzle provided with the rectifying member.

BACKGROUND ART

A descaling nozzle is used for the purpose of removing or peeling an oxidized scale on a steel plate before the steel plate is rolled in the rolling equipment of a steel mill. The descaling nozzle usually includes: a nozzle body (or a nozzle main body) having an axially extending flow path (or flow passage or flow channel); a plurality of slits for entering water into the flow path, in which the slits extend, at upstream of the nozzle body, in an axial direction of a circumferential wall with intervals in the circumferential direction of the wall; a rectifying member (a rectifier) for rectifying the water entered from the slits and mixed, in which the rectifying member is disposed in the flow path downstream of the slits; and a flow path extending in the downstream direction of the rectifying member and reaching a discharge port of a nozzle tip attached to the tip of the nozzle body. The slits form or constitute a filter (or a filter part) for preventing impurities or foreign matters from entering the flow path, and the rectifying member is provided with a plurality of blades axially extending at intervals in the circumferential direction of the nozzle body.

Attachment (or installation) of such a descaling nozzle to a header (or a nozzle header) causes irregular fluctuation of the flow rate distribution of water which is jetted from an orifice, due to a strong turbulent flow state of water in the header. With such a fluctuation, the deformation of the spray pattern, the increase of the spray thickness, or others are caused, the water cannot be jetted in a uniform flow rate distribution, and the damping of the collision force of the jet water increases. Thus, in order to remove a scale while preventing the speed down of the jet water (that is, to remove the scale with a high energy efficiency), the water is discharged or jetted from the discharge port by using the rectifying member for preventing the turbulence or disturbance of the water flow to reduce the diffusion of the jet water and improve the density of the droplets in the spray. Further, the descaling nozzle jets or ejects a water flow in a fan-shaped flat pattern in order to cover a steel plate having a wide width with a small number of nozzles. In this manner, since the descaling nozzle jets the water flow in an anisotropic form of a flat pattern from the discharge port through the slit filter, it is difficult to rectify the water flow, and it is difficult to improve the collision force of the water flow with increased droplet density.

Japanese Patent No. 5658218 (JP 5658218 B, Patent Document 1) discloses a high-pressure nozzle which has: a rectifying member disposed in a flow path leading to an outflow opening, a tapered portion formed downstream of the rectifying member, a long flow path extending from the tapered portion, and a tapered outflow chamber portion extending from the long flow path to the outflow opening. As the rectifying member, the document discloses a rectifying member having a radial configuration in a cross-sectional view which includes a flow path formed in a central axis portion thereof and a plurality of radially extending flow guide surfaces. The document also discloses that a filter having inflow slits formed at intervals in the circumferential direction is placed upstream of the rectifying member.

Japanese Patent No. 6127256 (JP 6127256 B, Patent Document 2) discloses a high-pressure jet nozzle device used in a ground improvement device for jetting liquid of a hardening material. The high-pressure jet nozzle device has a nozzle body attached to a side surface of a monitor provided with an air passage in the outer circumferential portion of a supply passage for cement milk and water. The nozzle body includes an intermediate inner diameter portion having an inner circumferential surface reduced in diameter in a tapered shape toward the front end direction of the nozzle body, a front end inner diameter portion having substantially the same diameter as the diameter of the front end of the intermediate inner diameter portion, and a rear end inner diameter portion having substantially the same diameter as the diameter of the rear end of the intermediate inner diameter portion or having a diameter larger toward the rear end direction. The rear end inner diameter portion of the nozzle body has a flow path division portion for dividing a hollow-shaped cross section into a plurality of spaces. As configurations of the flow path division portion, the document discloses that examples of the cross section of the flow path division portion include a cross-shaped form, a triangular form, a lattice form, a double annular form with four connecting walls radially extending from a central hollow tube body to the inner wall of the nozzle body, a form with four circumferentially adjacent hollow tube bodies inscribed in the inner wall of the nozzle body, or other forms.

Japanese Patent No. 5741886 (JP 5741886 B, Patent Document 3) discloses a descaling spray nozzle assembly including: a spray tip for discharging a liquid in a flat-shaped liquid spray pattern at a downstream end of a tubular member, and an inlet (a slit) communicating with an upstream end of a liquid passage of the tubular member, a multi-stage vane portion placed in an intermediate flow passage (path) between the spray tip and the inlet (slit). In the nozzle assembly, the multi-stage vane portion includes an upstream vane and a downstream vane disposed axially spaced from each other through a transition flow passage, each vane has a plurality of radial vane elements (a plurality of radially extending blades spaced from each other in the circumferential direction) which defines liquid laminar flow passages circumferentially spaced from each other, and the radial vane elements (blades) of the downstream vane are circumferentially displaced (or offset) from the radial vane elements (blades) of the upstream vane. The patent document 3 describes an example in which an upstream vane and a downstream vane each having five radial vane elements are disposed with displacing these vanes circumferentially at an angle of 36°.

Japanese Patent Application Laid-Open Publication No. 555-27068 (JP S55-27068 A, Patent Document 4) discloses a water spray nozzle for water curtain or other high-range spraying, and the nozzle includes a rectifying portion, a throttled portion, and a jetting portion. The rectifying portion has two rectifying lattices spaced from each other to form two-stage rectifying lattices, and each rectifying lattice has a honeycomb shape, a combination shape of a multiple tube and a cruciform (or cross-shaped) plate, a cruciform plate shape, or a quadrilateral grid (or lattice) shape. This document discloses that the shape of the rectifying lattice is preferably the honeycomb shape. Moreover, the document discloses that the ratio of the inlet diameter D and the length L of the throttled portion is set to $1.0 \leq L/D \leq 2.5$, the throttle portion expands radially outward the inlet and is narrowed by being curved radially inward near the outlet, and the jetting portion communicating with the outlet of the throttle portion is in a straight tubular shape.

CITATION LIST

Patent Literature

Patent Document 1: JP 5658218 B
Patent Document 2: JP 6127256 B
Patent Document 3: JP 5741886 B
Patent Document 4: JP S55-27068 A

SUMMARY OF INVENTION

Technical Problem

However, with respect to the nozzles of the patent documents 1 and 2, the rectifying member and the passage division portion provide a still small (or inadequate) rectifying action and fail to effectively prevent and rectify the turbulent flow occurring in the flow path, and thus it is difficult to discharge or jet the fluid in a rectified state from the discharge port. Due to the generated turbulent flow, the pressure loss is increased, and the fluid jetted from the discharge port has an unstable jetting or spraying pattern. Further, the collision force is reduced to decrease in washing or cleaning efficiency. For descaling, scales generated in the production process of hot rolled steel plates cannot be efficiently removed with a high erosion performance (scale removing ability or erosion ability).

The nozzles described in the patent documents 3 and 4 can increase a water rectifying function by the multi-stage rectifying portions. However, these rectifying members have a still small (or inadequate) rectifying function, and it is difficult to rectify the fluid in the flow path and to jet the fluid at a high density from the discharge port. In addition, even if the rectifying members with radial blades are disposed in multiple stages as in the patent document 3, the collision force of the jet fluid cannot be improved. Further, even if the rectifying lattices having a honeycomb shape, a grid (lattice) shape, or other shapes are disposed in two stages as in the patent document 4, the fluid cannot be uniformly sprayed or jetted from the discharge port at a predetermined jetting pattern and the spray speed may be attenuated. Furthermore, in a case where such rectifying lattices are disposed in two stages, clogging of the flow path is easy to occur, and the fluid cannot be stably jetted over a long period of time.

It is therefore an object of the present invention to provide a rectifying member (or a rectifier) useful for preventing or reducing the turbulence or disturbance of a fluid to effectively rectify the fluid, and a nozzle provided or equipped with the rectifying member.

Another object of the present invention is to provide a rectifying member (or a rectifier) useful for reducing the diffusion of a jet fluid to increase the density of the jet fluid and improving the collision (or impact) force of the jet fluid, and a nozzle provided with the rectifying member.

It is still another object of the present invention to provide a rectifying member (or a rectifier) useful for jetting a fluid in a flat pattern with a uniform and high collision force even in a case where a discharge port has an anisotropic shape such as a slit shape and an oval or elliptical shape, and a nozzle provided with the rectifying member.

It is another object of the present invention to provide a rectifying member (or a rectifier) of which clogging can be prevented even in a case where a water containing foreign matters such as an industrial water is used, and a nozzle provided with the rectifying member.

It is still another object of the present invention to provide a rectifying member (or a rectifier) which has a high erosion performance and is useful for improving a scale removal or peeling efficiency with a thin fan-shaped jetting or spraying pattern, and a descaling nozzle provided with the rectifying member.

Solution to Problem

The inventors of the present invention examined a nozzle which includes a nozzle body having an axially extending fluid flow path and a plurality of rectifying elements (such as rectifying lattices) disposed in the fluid flow path, wherein each rectifying element has division walls (or partition walls) by which the fluid flow path can be divided to form a plurality of flow path units, and the division walls of each rectifying element include the following:

a circumferential division wall group or peripheral division wall group (a plurality of circumferential division walls) inscribing with the inner wall of the nozzle body and circumferentially adjacent to each other, and an inside (or inner) division wall group (a plurality of inside division walls) being adjacent to the inside of the circumferential division wall group.

To achieve the above objects, the inventors made intensive studies on the relationship between the structure of the rectifying elements (such as rectifying lattices) disposed in the axial direction of the fluid flow path and the characteristics of a jet fluid from the nozzle.

The inventors finally found the following (1) and (2): (1) as viewed from the axial direction of the nozzle body, in an arrangement of the division walls of the adjacent rectifying elements in which an intersection of division walls (division walls divided by partition walls extending vertically, horizontally, radially, and circumferentially) of one rectifying elements is positioned within a flow path unit defined by division walls of the other rectifying element, the fluid in the flow path unit divided by the division walls of the upstream rectifying element is subdividable into a plurality of fluids (is dividable into segmentalized forms such as three or more, for example, four subdivided fluids) by the division walls or partition walls of the downstream rectifying element to greatly improve the rectifying function (effect) of the fluid by the rectifying members, and the fluid is capable of being jetted at a high density; (2) in a case where the inside division wall group (the inside division walls) is formed by inside division walls regularly arranged or disposed and the circumferential division wall group or peripheral division wall group is formed having no narrow flow path in association with the inner wall of the nozzle body, the fluid is effectively rectifiable entirely, and the fluid is uniformly jettable at a high density while reducing the pressure loss or drop, and clogging caused by foreign matters is effectively preventable.

Further, the inventors found that when the circumferential or peripheral division wall group and the inside division wall group are formed in a predetermined pattern, which may include a lattice pattern, the fluid can be jetted in a uniform flow rate distribution even if an orifice (a discharge port) has an anisotropic shape such as an oval or elliptical shape (for example, a long and narrow oval shape), and the fluid can be jetted with a uniform and high collision force even if the spraying pattern of the fluid is a flat pattern. The present invention was accomplished based on the above findings.

That is, the present invention relates to a rectifying member (or a rectifier) which is disposed in a fluid flow path extending in an axial direction of a nozzle body and divides or segments the fluid flow path into a plurality of flow path units. The rectifying member includes or comprises a plurality of rectifying elements (division wall units) capable of being disposed or installed adjacently in an axial direction of the fluid flow path (with close to each other with a predetermined interval (or space) or without a predetermined interval (or space)), and each rectifying element (division wall unit) includes or comprises a tubular casing capable of being installed in the nozzle body, and a division wall structure which is formed or disposed in the casing and has an axially extending division wall (a partition wall extending parallel to the axial direction). The division wall structure (or divisional or segmental wall structure) comprises a circumferential division wall group (a peripheral division wall group or a plurality of circumferential division wall units) and an inside division wall group (a plurality of inside division wall units). The circumferential division wall group is adjacent (or the circumferential division walls are adjacent to each other) in a circumferential direction of an inner wall of the casing, to configure or form a circumferential flow path unit group (or peripheral flow path unit group or a plurality of circumferential flow path units) at a circumferential (or peripheral) region of the fluid flow path. The inside division wall group is adjacent to the circumferential division wall group to configure or form an inside flow path unit group (a plurality of inside flow path units) at an inside region of the fluid flow path. The circumferential division wall group and the inside division wall group have the following configuration (1) and/or (2):

(1) as viewed from the axial direction of the nozzle body, in the axially adjacent rectifying elements (division wall units), an intersection of division wall units of an inside division wall group of one rectifying elements is positioned within (or in) a flow path unit defined with a division wall unit of an inside division wall group of another rectifying element, (2) the inside division wall group contains the plurality of division wall units regularly arranged or disposed; the circumferential division wall has or forms no narrow flow path in association with the inner wall of the casing.

The circumferential division wall group and the inside division wall group may comprise, for example, partition walls extending vertically (or longitudinally), horizontally (or latitudinally), circumferentially, and/or radially, and may comprise (a) a division wall group comprising a plurality of polygonal-shaped (such as lattice-shaped) division wall units being adjacent to each other; (b) a division wall group comprising: a plurality of polygonal-shaped division walls (such as a honeycomb-shaped division wall group) being adjacent to each other to form a polygonal-shaped inside flow path unit group, and a plurality of extending partition walls (or radial walls) traversing the plurality of polygonal-shaped division walls in a radial direction or extending from circumferential walls of the polygonal-shaped division walls in the radial direction to reach the inner wall of the casing; or (c) a division wall group comprising: one or more concentric polygonal-shaped or concentric ring-shaped annular walls, a plurality of intermediate radial walls which radially extend from circumferentially different positions (or different positions in the circumferential direction), to connect the annular walls at least radially adjacent to each other, and a plurality of extending partition walls (outer radial walls) radially extending from the outermost annular wall, at positions circumferentially different from the intermediate radial walls (or at positions different from the intermediate radial walls in the circumferential direction), to reach the inner wall of the casing. In the division wall group (C), for a division wall structure including one (a single) annular wall, the inner wall of the casing is regarded as an annular wall, and the annular wall and the inner wall of the casing may form two annular walls adjacent to each other. The radial walls do not necessarily need to divide the innermost annular wall; the radial walls may have innermost radial walls radially extending from a central portion of the innermost annular wall in the radial directions to reach the innermost annular wall. That is, the innermost radial walls may be formed with or without traversing the central portion of the innermost annular wall.

Further, the rectifying elements may be capable of being disposed adjacently to each other in the axial direction of a cylindrical fluid flow path of the nozzle body. The rectifying elements (rectifying lattices) each have a lattice (or latticed, lattice-shaped, or grid-shaped) partition wall structure including: a plurality of horizontal or latitudinal partition walls (or horizontal or latitudinal division walls) extending in an X-axis direction as a horizontal or latitudinal direction to divide the fluid flow path with a predetermined pitch (or interval) in a Y-axis direction as a vertical or longitudinal direction, and a plurality of vertical or longitudinal partition walls (or vertical or longitudinal division walls) extending in the Y-axis direction as the vertical direction to divide the fluid flow path with a predetermined pitch (or interval) in the X-axis direction as the horizontal direction. In such a partition wall structure (lattice structure), (a-1) the horizontal partition walls and the vertical partition walls may have a different number of partition walls from each other and may be disposed with the same or a different pitch from each other, or (a-2) densities (or pitches) of the horizontal partition walls and the vertical partition walls may be higher in a central region of the fluid flow path, and the horizontal partition walls and the vertical partition walls may have the same or a different number of partition walls. The division wall structure may be symmetrical (line-symmetrical) with respect to the X-axis or the Y-axis as a central axis.

Further, in the lattice partition wall structure, the horizontal partition walls and the vertical partition walls may be formed or disposed in a relation that the number of either one of the horizontal and the vertical partition walls is represented as n and the number of the other partition walls is represented as n+1, where n denotes an integer of 2 to 8. Of the horizontal and the vertical partition walls, the partition walls with an even number of partition walls may be arranged to avoid a central portion of a cylindrical fluid flow path, and a central partition wall of the partition walls with an odd number of partition walls may be arranged to traverse a central portion of the casing.

The circumferential division wall group (or outer division wall group or outer circumferential division wall group) may comprise a peripheral division wall group which comprises a plurality of circumferentially adjacent peripheral division walls or division wall units contacting with the inner wall of the casing. The peripheral division wall group may comprise a plurality of extending partition walls extending from the plurality of division wall units of the inside division wall group to reach the inner wall of the casing to form division wall units in association with the inner wall of the casing. The peripheral division wall group may have a configuration (5-1) and/or (5-2): (5-1) among the plurality of horizontal partition walls and vertical partition walls in the peripheral division wall group, at least one end of at least one partition wall close to or facing the inner wall of the casing is connected or joined to the other partition wall or division wall without reaching the inner wall of the casing, (5-2) among the plurality of extending partition walls (extending division walls), an extending partition wall having a short length to the inner wall of the casing is absent or open. At least the longest extending partition wall is bonded to the inner wall of the casing without absence.

The inside division wall group (or inner division wall group) may contain a plurality of division wall units or inside division walls (division wall unit group) being adjacent to each other and being regularly arranged or disposed with a predetermined pitch. For example, the inside division wall group may comprise division wall units arranged or disposed regularly in a symmetrical shape with respect to the X-axis of the horizontal direction or the Y-axis of the vertical direction as a central axis, or may have a lattice (or lattice-shaped) division wall structure formed with vertically and horizontally extending partition walls (or partition walls extending in the vertical and horizontal directions) with a predetermined pitch.

More specifically, the rectifying elements each may have a lattice division wall structure which comprises a plurality of vertical partition walls and a plurality of horizontal partition walls to divide the fluid flow path with a predetermined pitch in the horizontal direction and the vertical direction, respectively; the division wall structure may have the horizontal partition walls and the vertical partition walls in a relation that the number of either one of the horizontal and the vertical partition walls is represented as n and the number of the other partition walls is represented as n+1, where n denotes an integer of 3 to 5, and the partition walls with an even number of partition walls may be arranged to avoid a central portion of the fluid flow path. A central partition wall of the partition walls with an odd number of partition walls may be arranged to traverse a central portion of the casing. Among the partition walls with an odd number of partition walls, a partition wall at least positioned in a central region [for example, a partition wall in the inside region (or central region), which is not close to or does not face the inner wall of the casing] may reach (or may be bonded to) the inner wall of the casing. Of the vertical partition walls and the horizontal partition walls (the partition walls with an even number of partition walls and/or the partition walls with an odd number of partition walls), a partition wall at least positioned in the central region (or inside region) may reach the inner wall of the casing (or may be connected and bonded to the inner wall), and a partition wall positioned in a side or peripheral region (for example, a partition wall close to or facing the inner wall of the casing) may have both ends each connected or joined to an intersecting (or contacting) partition wall or division wall without reaching the inner wall of the casing.

As described above, the circumferential division wall group may comprise a plurality of circumferentially adjacent peripheral division walls contacting with the inner wall of the casing; the inside division wall group may comprise a plurality of division wall units being adjacent to each other with a predetermined pitch, and the division wall units may be regularly arranged or disposed symmetrically with an X-axis of a horizontal direction or a Y-axis of a vertical direction as a central axis. (7-1) The plurality of rectifying elements may be capable of being disposed in the fluid flow path with circumferential displacement (or with the rectifying elements displaced from each other in the circumferential direction). For example, (7-2) when the X-axis of the horizontal direction or the Y-axis of the vertical direction is defined as a reference axis, the rectifying elements may be capable of being disposed with circumferential displacement of the reference axis of one rectifying element at an angle of 15 to 180° (for example, 15 to 90°) with respect to the reference axis of another (or the other) rectifying element.

As viewed from the axial direction of the nozzle body, in a state in which the adjacent rectifying elements are displaced from each other in the circumferential direction, the plurality of rectifying elements is preferably provided in a configuration in which the division walls (or partition walls extending in a predetermined direction) are not overlapped with each other (or in a configuration in which the fluid can be subdivided). As viewed from the axial direction of the nozzle body, the plurality of rectifying elements may be capable of being disposed in a configuration in which an intersection of division walls of one rectifying element of the adjacent rectifying elements is positioned within (or in) a central region (or a central portion) of a flow path unit defined with a division wall of another (or the other) rectifying element.

(9-1) The minimum flow path diameter of flow path diameters defined with the division walls of the circumferential division wall group may be 50% or more with respect to the minimum flow path diameter of flow path diameters defined with the division walls of the inside division wall group.

(9-2) The rectifying elements may have an opening area ratio R (a ratio of an area of a fluid flow path having a division wall or partition wall formed therein relative to an area of a fluid flow path having neither division wall nor partition wall) of about 60 to 93%. Further, in order to increase the rectifying function (or action) on the fluid, (9-3) the equation L/P=3 to 15 may be satisfied, wherein P represents a pitch (or addition average pitch) of partition walls being adjacent to each other in an X-axis direction and a Y-axis direction of the fluid flow path, and L represents a total axial length of axially adjacent partition walls (or a total axial length of partition walls extending in the axial direction). The rectifying elements, which are capable of being axially adjacently disposed, may be capable of being circumferentially positioned to each other.

The present invention also includes the rectifying element. Specifically, the rectifying element is capable of being disposed or installed in each of sites adjacent to each other in an axial direction of a fluid flow path of a nozzle body, the rectifying elements are adjacent to each other and are circumferentially displaced from each other, and the rectifying element comprises a cylindrical casing and the division wall structure disposed in the casing.

The present invention also includes a nozzle which comprises a nozzle body having a fluid flow path and the rectifying member (a rectifying member provided with a plurality of rectifying elements) disposed in the fluid flow path of the nozzle body. In such a nozzle, the nozzle body may form a nozzle body of a descaling nozzle. The descaling nozzle body may comprise: an entering flow path capable of entering or introducing a fluid into the nozzle body through a filter, a rectifying flow path which is positioned downstream of the entering flow path and in which the rectifying member is capable of being disposed, an intermediate flow path extending in a downstream direction from the rectifying flow path, and a jet flow path (or a jet chamber) jettable the fluid, which passed through the intermediate flow path, from an orifice (a discharge port) having a long and narrow or an oval (or elliptical) shape (for example, a long and narrow oval shape).

Further, the nozzle body may comprise one or more tubes (or tubular bodies or pipes), and the tubes may comprise a tube in which the rectifying member is capable of being disposed and which has a filter element (or a strainer) attached thereto. The filter element may have at least a circumferential or peripheral wall having scattered inflow holes (or perforated inflow holes) and/or a plurality of axially extending slit-shaped inflow holes at intervals in the circumferential or peripheral direction. Furthermore, a rectifying element positioned at the most downstream may comprise partition walls extending in vertical and horizontal directions, a circumferential direction, and/or radial directions (or extending vertically, horizontally, circumferentially, and/or radially), and the rectifying element positioned at the most downstream may be disposed or installed in a rectifying flow path in a configuration in which the partition walls are oriented at an angle of 0 to 90° with respect to a long axis direction of an orifice (a discharge port) having a long and narrow or an oval (or elliptical) shape.

In the present specification, the partition wall refers to a wall forming a division wall which divides or partitions a flow path into a predetermined form or shape and through which a fluid can flow, and since the partition wall forms the division wall, the partition wall may be used synonymously with the division wall. The division wall may be used synonymously with a division wall unit. A lattice division wall structure may be simply referred to as a "lattice structure", and a rectifying element having the lattice structure may be simply referred to as a "rectifying lattice." Further, the partition wall extending from the division wall of the inside division wall group and reaching the inner wall of the casing may be referred to as an extending partition wall among the circumferential division wall group (or the peripheral division wall group).

In the present specification, the term "vertical partition wall (or vertical division wall)" means a partition wall which extends in a Y-axis direction being a vertical direction and divides or partitions a fluid flow path with a predetermined pitch (or interval) in an X-axis direction being a horizontal direction, and the term "horizontal partition wall (or horizontal division wall)" means a partition wall which extends in the X-axis direction being the horizontal direction and divides or partitions a fluid flow path with a predetermined pitch (or interval) in the Y-axis direction being the vertical direction.

In a symmetrical structure such as a lattice division wall structure, when the angle position in the circumferential direction is rotated by 90° from a position where the division wall structure is overlapped, the vertical and horizontal directions are reversed, and when the angle position in the circumferential direction is rotated by 180°, the upper and lower directions are reversed, so that the "vertical direction" and the "horizontal direction" may be replaced with each other, the "upper direction" and the "lower direction" may be replaced with each other, and the "vertical partition wall (or vertical division wall)" and the "horizontal partition wall (or horizontal division wall)" may also be replaced with each other.

Advantageous Effects of Invention

According to the present invention, the specific rectifying member allows prevention of the turbulence of the fluid to effectively rectify the fluid and jet or spray the fluid uniformly. Thus, the diffusion of the jet fluid (jetted fluid) can be reduced to increase a density of the jet fluid and improve a collision force. Moreover, the rectifying member enables the fluid to be jetted from the nozzle in a flat pattern with a uniform and high collision force even if the orifice (the discharge port) is a discharge port having an anisotropic shape such as a slit shape and an oval shape. Further, the formation of the circumferential division walls without the formation of a narrow flow path allows the improvement (or increase) of the collision force and the reduction of the anisotropy of the flow rate distribution, and prevents the rectifying member from clogging even with use of a water containing foreign matters such as an industrial water. Furthermore, in a case where the rectifying member is used for a descaling nozzle, the nozzle has a high erosion performance to improve the scale removal or peeling efficiency in a thin fan-shaped jetting (or spraying) pattern.

BRIEF DESCRIPTION OF DRAWINGS

FIG. 1 is a schematic perspective view showing a descaling nozzle as an example of a nozzle according to an embodiment of the present invention.

FIG. 2 is a schematic view showing the descaling nozzle of FIG. 1, FIG. 2(*a*) is a schematic cross-sectional view showing the descaling nozzle of FIG. 1, and FIG. 2(*b*) is a schematic view showing an upstream end face of a filter element of FIG. 1.

FIG. 3 is a schematic perspective view showing a rectifying member of FIG. 1.

FIG. 4 is a schematic view showing a lattice structure of a rectifying element of FIG. 1, FIG. 4(*a*) is an end elevational view taken along line I-I in FIG. 2(*a*), FIG. 4(*b*) is an end elevational view taken along line II-II in FIG. 2(*a*), and FIG. 4(*c*) is a cross-sectional view taken along line II-II in FIG. 2(*a*).

FIG. 5 Each of FIGS. 5(*a*) to (*f*) is a schematic view showing another lattice structure of a rectifying element.

FIG. 6 Each of FIGS. 6(*a*) to (*c*) is a schematic view showing still another lattice structure of a rectifying element.

FIG. 7 is a schematic view showing a non-lattice (or non-latticed) division wall structure of a rectifying element.

FIG. 8 Each of FIGS. 8(*a*) and (*b*) is a schematic view showing another non-lattice division wall structure of a rectifying element.

FIG. 9 Each of FIGS. 9(*a*) to (*e*) is a schematic cross-sectional view showing still another non-lattice division wall structure of a rectifying element and showing a state in which the two rectifying elements are adjacent to each other.

FIG. 10 is a graph showing a relationship between an opening area ratio R and a collision force (jet distance:200 mm) in Example 1.

FIG. 11 is a schematic view showing a relationship among pitches "Ph1", "Ph2", "Pv1", and "Pv2" in Example 5.

FIG. 12 is a schematic view showing a relationship among pitches "Ph1", "Ph2", "Pv1", and "Pv2" in a first example of Example 6.

FIG. 13 is a schematic view showing a relationship among pitches "Ph1", "Ph2", "Pv1", and "Pv2" in a second example of Example 6.

FIG. 14 is a graph showing a relationship between an opening area ratio R and a collision force (jet distance:200 mm) in Examples 1, 2, and 8.

FIG. 15 is a photograph showing a clogging state of particles in a rectifying element of Example 1-3, FIG. 15(*a*) is a photograph showing a first rectifying element positioned downstream, and FIG. 15(*b*) is a photograph showing a second rectifying element positioned upstream.

DESCRIPTION OF EMBODIMENTS

Hereinafter, the present invention will be described in detail with reference to the drawings if necessary. In the following description, the same members or elements, or members or elements having a common function may be denoted by the same reference numerals. In the following embodiments illustrated, only one rectifying element of two rectifying elements is shown except for FIG. 3, FIG. 4(*c*), and FIG. 9.

[Rectifying Member Having Lattice Division Wall Structure (Rectifying Lattice)]

FIG. 1 to FIG. 4 show an example of a descaling nozzle provided with a rectifying member having a lattice division (or dividing) wall structure (a rectifying lattice) as a representative configuration of an embodiment (a). The descaling nozzle has a fluid flow path 1 extending in an axial direction or a longitudinal direction (Z-axis direction) from upstream toward downstream in order to jet or eject water as a fluid from an orifice (a discharge port) 28. The fluid flow path includes a cylindrical entering flow path 2, a cylindrical flow path, and a jet flow path 26; the cylindrical entering flow path 2 is formed with a perforated filter element 3 having a hollow cylindrical cross section and is capable of entering or introducing a fluid from the upstream, the cylindrical flow path is formed with a substantially cylindrical nozzle body 5 attachable to the filter element 3 and extends from the cylindrical entering flow path 2 in the downstream direction, and the jet flow path 26 is formed with a substantially cylindrical nozzle case 30 attachable to the nozzle body 5 and is for jetting the fluid passed through the flow path of the nozzle body 5 from an orifice (a discharge port) 28 at a tip or downstream end. An upstream circumferential wall and an upstream end wall of the filter element 3 have a plurality of holes or pores 4 for inhibiting an entering of foreign matters or impurities contained in a fluid. That is, the filter element 3 functions as a strainer and prevents the foreign matters from entering the nozzle body 5.

The cylindrical flow path of the nozzle body 5 includes: a cylindrical rectifying flow path 6 which is formed with a first pipe body (casing) 7 being attachable to the filter element 3 and having a hollow cylindrical cross section and extends from the entering flow path 2 in the downstream direction, and in which the rectifying member 11 can be disposed or installed; and an intermediate flow path 20 which is formed with a second pipe body (casing) 23 being attachable to the first pipe body 7 and having a hollow cylindrical cross section and extends from the rectifying flow path 6 in the downstream direction. The intermediate flow path 20 includes: a first cylindrical intermediate flow path 21 narrowed at a predetermined gentle taper angle from the rectifying flow path 6 toward the downstream direction; and a second cylindrical intermediate flow path 22 extending with the same inner diameter from the first intermediate flow path in the downstream direction. In this example, the rectifying flow path 6 formed with the first pipe body (casing) 7 has an inner diameter of 15 to 19 mmϕ by a casing 12 of the rectifying member 11 which is installed in the rectifying flow path 6. A screwing portion formed at an upstream end portion of the first pipe body (casing) 7 can be screwed to a screwing portion formed at a downstream end portion of the perforated filter element 3. A screwing portion formed at an upstream end portion of the second pipe body (casing) 23 can be screwed to a screwing portion formed at a downstream end portion of the first pipe body (casing) 7. An offset flow path having a predetermined length L1 is formed between the most downstream hole 4 of a large number of holes 4 formed in the filter element 3 and a downstream end of the filter element 3 (an upstream end of the rectifying member 11). In this example, the length L1 of the offset flow path is about 5 to 20 mm, and preferably 10 to 15 mm.

Further, in this example, an angle (or gradient) θ1 of the inner wall of the first intermediate flow path 21 with respect to an axis line (Z-axis) is 3 to 4.5° (taper angle 6 to 9°).

A screwing portion formed at an upstream end portion of the nozzle case 30 can be screwed to a screwing portion formed at a downstream end portion of the second pipe body (casing) 23. The nozzle is, in the nozzle case 30, provided with a bush (or annular wall member) 25, and a nozzle tip 27 made of cemented carbide attached to the tip or end portion; the bush 25 has a cylindrical flow path 24 extending from upstream toward downstream with an inner diameter substantially the same as that of the second intermediate flow path 22. The nozzle tip 27 is inhibited or prevented from falling out in the tip direction by a hooking shoulder portion 29. The nozzle tip 27 has a jet flow path 26 narrowing a flow path in a tapered form, that is, a jet flow path 26 narrowed at a predetermined taper angle θ2 from the cylindrical flow path 24 toward the downstream direction. The jet flow path is opened at the tip or end portion to form an orifice 28. In this example, the taper angle 82 of the jet flow path 26 is about 40 to 60° (for example, about 45 to 55°). The nozzle tip 27 has a tip surface in the form of a curved recessed surface by a curved groove extending in the radial direction and having a U-shaped cross section, and the jet flow path 26 is opened at a central portion of the curved recessed surface to form the orifice 28 having an oval or elliptical form.

The rectifying member 11 is provided with a first rectifying element (rectifier element) 11*a* and a second rectifying element (rectifier element) 11*b* which can be adjacently disposed or installed to each other in the rectifying flow path 6 at a predetermined interval L2 (in this example, an interval of about 4 to 6 mm) in the axial direction (Z-axis direction).

Each of the rectifying elements 11*a* and 11*b* has a lattice division or dividing wall structure (a partition wall structure, a lattice structure) 13 in the same configuration. That is, each of the rectifying elements 11*a* and 11*b* is provided with a cylindrical casing 12 and a lattice structure (a partition wall structure) 13 integrally formed with the casing. In order to position the second rectifying element 11*b* in the circumferential direction with respect to the first rectifying element 11*a*, each of the casings 12 adjacent to (facing) each other have an open end portion with an engaging projection (or protrusion) 12*a* and an engaging cutout (or notch) 12*b*, wherein the projection 12*a* and the cutout 12*b* have shapes that can be engaged with each other, and the projection 12*a* and the cutout 12*b* are disposed along the circumferential direction of the open end portion. In this example, the casings 12 of the first rectifying element 11*a* and the second rectifying element 11*b* are disposed with the engaging projections 12*a* and the engaging cutouts 12*b*, which are engageable with each other, facing each other in the axial direction, so that the rectifying elements 11*a* and 11*b* can be positioned by engaging with each other at an angle position of 90° in the circumferential direction. In this example, the casing 12 of the first rectifying element 11*a* and the casing 12 of the second rectifying element 11*b* have the engaging projections 12*a* and the engaging cutouts 12*b*, respectively, facing each other in the X-axis direction; and the engaging cutouts 12*b* and the engaging projections 12*a*, respectively, facing each other in the Y-axis direction.

The division wall structure 13 is formed with a plurality of vertical partition walls (vertical division walls) 14 and a plurality of horizontal partition walls (horizontal division walls) 15; the vertical partition walls extend in the axial direction (Z-axis direction) to divide the fluid flow path 1 with a predetermined pitch P in the horizontal direction (X-axis direction) with respect to the axial direction (Z-axis direction) of the casing 12, and the horizontal partition walls 15 extend in the axial direction (Z-axis direction) to divide the fluid flow path with a predetermined pitch P in the vertical direction (Y-axis direction). The lattice structure (partition wall structure) 13 is formed in the relationship: when either one of the vertical partition walls 14 and the horizontal partition walls 15 (in FIG. 4(*a*), the horizontal partition walls 15) has n partition walls, the other partition walls (in FIG. 4(*a*), the vertical partition walls 14) has n+1 partition walls. In this example, as shown in FIG. 4(*a*), a lattice structure having the number n=4 of partition walls is shown, and the lattice structure includes the horizontal partition walls 15 of n=4 formed at equal intervals (pitch) P (corresponding to the vertical partition walls 14 displaced in a phase with an angle of 90° in the circumferential direction in FIG. 4(*b*)) and the vertical partition walls 14 of n+1=5 formed at the same equal intervals (pitch) P as those of the horizontal partition walls (corresponding to the horizontal partition walls 15 in FIG. 4(*b*)). The horizontal partition walls 15 with a smaller and even number of partition walls are formed with avoidance of a central portion or center of the cylindrical fluid flow path 1, the vertical partition walls 14 with a larger and odd number of partition walls comprise a central vertical partition wall crossing the central portion of the cylindrical fluid flow path 1, and intermediate vertical partition walls in a central region (or inside region) containing the central vertical partition wall (partition walls positioned in the central region in the horizontal direction in FIG. 4(*a*)) are joined or connected to the inner wall of the casing 12 across the central portion of the cylindrical fluid flow path 1. Such a division wall structure 13 is formed in a symmetrical shape (line-symmetric shape) or the same shape with the X-axis or the Y-axis as the central axis. That is, as shown in FIGS. 4(*a*) and 4(*b*), when the first rectifying element (rectifier element) 11*a* and the second rectifying element (rectifier element) 11*b* are displaced with each other in the circumferential direction at an angle of 90°, each element has the division wall structure 13 having the same configuration. The vertical partition walls 14 and the horizontal partition walls 15 are formed at the same pitch with respect to (or in association with) the center of the casing 12 or the fluid flow path 1, and have a lattice structure (a lattice division wall structure) having a symmetrical shape (line-symmetric shape) with the X-axis or the Y-axis as the central axis. The vertical partition walls 14 having a larger number of partition walls are formed with a pitch P (P=D/(n+2)) which equally divides the inner diameter (fluid flow path) D of the casing 12. The horizontal partition walls 15 having a smaller number of partition walls are formed with substantially the same pitch P with respect to (or in association with) the axial center of the casing 12 (fluid flow path) as a center.

The division wall structure 13 includes or comprises, as shown in FIGS. 4(*a*) (b), a peripheral division wall group (a plurality of peripheral division walls) 18 adjacent in a circumferential direction of the inner wall of the casing 12 to form the circumferential region (peripheral region) of the fluid flow path 1, and an inside division wall group (a plurality of inside or inner division walls) 19 adjacent to the peripheral division wall group to form an inside or inner region of the fluid flow path 1. The peripheral division wall group 18 includes a plurality of non-lattice division wall units 16*a* formed in association with the inner wall of the casing 12 (that is, a plurality of non-lattice division wall units 16*a* divided or partitioned by the inner wall of the casing 12, and the vertical partition walls 14 and the horizontal partition walls 15). The inside division wall group 19 is formed with a plurality of lattice division wall units 16*b* divided or partitioned by the vertical partition walls 14 and the horizontal partition walls 15 regularly adjacent to each other in the vertical and horizontal directions. Each division wall unit (non-lattice or lattice division wall unit) 16*a*, 16*b* subdivides the fluid flow path to form a flow path unit (a non-lattice or lattice flow path unit corresponding to the form of each division wall unit 16*a*, 16*b*).

Further, as shown in FIG. 4(*a*), of the vertical partition walls 14 and the horizontal partition walls 15 forming the inside division wall group 19, both end portions of the horizontal partition walls 15 having the number n=4 (even number) of partition walls form extending partition walls 17 connected or joined to the inner wall of the casing 12. On the other hand, of the vertical partition walls 14 having the number n+1 (odd number) of partition walls, both end portions of three vertical partition walls in the central region form extending partition walls 17 connected or joined to the inner wall of the casing 12; of the vertical partition walls 14 having the number n+1 of partition walls, both end portions of the partition walls (two horizontal partition walls positioned in the upper and lower portions in FIG. 4(*b*)) 14*a* in both side portions close to or facing the inner wall of the casing 12 are connected or joined to the horizontal partition walls 15 having the number n of partition walls without reaching or connecting to the inner wall of the casing 12. Thus, non-lattice division wall units having a larger flow path diameter are formed between the inner wall of the casing 12, and the vertical partition wall 14 and the horizontal partition wall 15. That is, assuming that, of the vertical partition walls 14 having the number n+1=5 of partition walls, both end portions of the two vertical partition walls 14*a* positioned in the both side portions (the upper and lower portions in FIG. 4(*b*)) reach the inner wall of the casing 12, a partition wall which reaches the inner wall of the casing 12 from the horizontal partition walls 15 in the both side portions is absent or open in order to avoid formation of a narrow flow path in the peripheral division wall group 18. In other words, when it is assumed that the peripheral division wall group 18 is provided with a plurality of extending partition walls 17 which extend from the plurality of vertical and horizontal partition walls 14 and 15 of the inside division wall group 19 to the inner wall of the casing 12 and which form non-lattice division wall units 16*a* in association with the inner wall of the casing 12, the division wall structure 13 of each rectifying element 11*a*, 11*b* has a configuration without or free from an extending partition wall 17 having a short length to the inner wall of the casing 12 (in this example, an extending partition wall having the shortest length) among the extending partition walls 17 (the extending partition walls 17 extending from the vertical partition walls 14 having the number n+1=5 of partition walls).

The lattice structure 13 having such a peripheral division wall group 18 and inside division wall group 19 can prevent overlapping of the division walls even if the second rectifying element 11*b* is circumferentially displaced (or is displaced in the circumferential direction) with respect to the first rectifying element 11*a*. That is, as shown in FIG. 4 (*c*), even if the second rectifying element 11*b* is circumferentially displaced at an angle of 90° with respect to the first rectifying element 11*a*, (1) as viewed from the axial direction of the nozzle body 5, an intersection (cross-shaped intersection) of the division wall units 16*b* of the inside division wall group 19 of one rectifying element 11a or 11b of the first and second rectifying elements 11a and 11b axially adjacent to each other is positioned within the central portion of the flow path unit formed of the division wall unit 16b of the inside division wall group 19 of the other rectifying element 11b or 11a. Thus, a fluid from upstream can be subdivided or divided (or split) into four fluids at the intersection portion (cross-shaped intersection portion) of the lattice partition walls 14 and 15 of the second rectifying element 11b, and each divided fluid can further be subdivided or divided (or split) into four fluids at the intersection portion of the lattice partition walls 14 and 15 of the first rectifying element 11a, and then can be distributed downstream. Further, in a state in which the second rectifying element 11b is circumferentially displaced at an angle of 90° with respect to the first rectifying element 11a, the intersection portion (cross-shaped intersection portion and T-shaped intersection portion) of the partition walls 14 and 15 of the second rectifying element 11b is positioned within a non-lattice division unit formed by the partition walls 14 and 15 of the first rectifying element 11a without overlapping of the vertical and horizontal partition walls 14 and 15 even in the peripheral division wall group 18. Thus, even in the peripheral division wall group 18, the fluid can be sequentially or successively subdivided or divided (or split) by the second rectifying element 11b and the first rectifying element 11a, and the rectifying action or function on the fluid can significantly be improved.

Further, in the lattice structure 13, (2) the inside division wall group 19 is formed by regularly arranging or disposing a plurality of lattice division wall units 14 and 15, whereas the peripheral division walls 18 are formed in a non-lattice form without forming a narrow flow path (narrowed flow path) in association with the inner wall of the casing 12. For example, the smallest division wall unit having the smallest flow path area of division wall units 16a of the peripheral division wall group 18 has an opening area of 70% or more (for example, 75 to 200%) of an opening area of the smallest division wall unit having the smallest flow path area of the division wall units 16b of the inside division wall group 19. Thus, it is possible to prevent the turbulent flow of the fluid near the inner wall of the first cylinder (casing) 7 and the casing 12, to reduce an anisotropy of a flow rate distribution, and to further rectify the flow. Since the peripheral division wall group 18 has no narrow flow path (or narrow division wall), even in a case where the directions of the vertical and horizontal partition walls 14 and 15 of the first rectifying element 11a positioned on the most downstream side with respect to the long axis of the orifice 28 of the nozzle are different, the rectifying function can effectively be expressed to reduce the anisotropy of the flow rate distribution accompanying the direction (oriented direction) of the vertical and horizontal partition walls 14 and 15. Thus, the installation of the first rectifying element 11a in the rectifying flow path 6 can reduce the directivity of the flow. Further, since an opening area of the peripheral division wall group (partition wall group) 18 can be increased, clogging of foreign matters in the fluid flowing along the inner wall of the casing 12 can be effectively prevented.

[Example of Another Lattice Structure]

In a preferred embodiment of the lattice structure, at least the circumferential division wall group (or peripheral division wall group), particularly the whole division wall structure (the circumferential division wall group and the inside division wall group), preferably has no narrow flow path, particularly no narrow flow path defined with circumferentially adjacent extending partition walls, the inner wall of the casing, and the circumferential division wall. The division wall structure having no narrow flow path reduces an anisotropy of a flow rate distribution due to a direction of a partition wall of a rectifying lattice to jet a fluid with a uniform distribution and also prevents the elements from clogging.

The rectifying element having the lattice structure with no narrow division wall is not limited to the lattice structures as examples shown in FIG. 4 and may be formed in various embodiments. For example, a lattice structure formed of partition walls having the number n of partition walls and partition walls having the number n+1 of partition walls includes, as shown in FIG. 5 (*a*), the following: vertical partition walls 34a having the number n+1=4 (even number) of partition walls formed at the same pitch without traversing the central portion of the casing 12; and horizontal partition walls 35a having the number n=3 (odd number) of partition walls, of which the central partition wall traverses the central portion of the casing 12. Among the vertical partition walls 34a of n+1=4 (even number), vertical partition walls 34a located at left and right ends (or sides) are connected to the horizontal partition walls 35a without reaching the inner wall of the casing 12, and the horizontal partition walls 35a of n=3 (odd number) reach the inner wall of the casing 12. Specifically, both end portions of two vertical partition walls 34a close to or facing the inner wall of the casing 12 among the even number of vertical partition walls 34a are connected or joined to the odd number of horizontal partition walls 35a without connecting to or reaching the inner wall of the casing 12, so that the formation of a narrow flow path in relation to the inner wall of the casing 12 is avoided. That is, among the extending partition walls 37a of the even number of vertical partition walls 34a, extending partition walls 37a having a short length to the inner wall of the casing 12 (in FIG. 5 (*a*), extending partition walls 37a having the shortest length located at left and right ends (or sides)) is absent or open (or removed).

An example shown in FIG. 5(*b*) has the same structure as that of FIG. 5(*a*) except that a lattice structure is formed of vertical partition walls 34b having the number n=4 (even number) of partition walls and horizontal partition walls 35b having the number n+1=5 (odd number) of partition walls. That is, the horizontal partition walls 35b having the number n+1=5 (odd number) of partition walls reach the inner wall of the casing 12; among the vertical partition walls 34b of the number n=4 (even number) of partition walls, two vertical partition walls in the central region reach the inner wall of the casing 12, both end portions of partition walls 34b in the both side portions close to or near the inner wall of the casing 12 (in FIG. 5(*b*), two vertical partition walls located at left and right ends (or sides)) are connected or joined to the horizontal partition walls 35b having the number n+1 of partition walls without reaching the inner wall of the casing 12. Also in this example, among the extending partition walls 37b of the even number of vertical partition walls 34b, extending partition walls 37b having a short length to the inner wall of the casing 12 (in FIG. 5(*b*), extending partition walls having the shortest length located at left and right ends) is absent or open (or removed).

Moreover, as shown in FIG. 5 (*c*), horizontal partition walls 35c of n=5 and six vertical partition walls 34c may be arranged at the same pitch to form a lattice structure. In the division wall structure, the vertical partition walls 34c having the number n+1=6 (even number) of partition walls comprise two pairs of first, second, and third vertical partition walls 34c; the first vertical partition wall 34c is positioned at the central region (or inside region), the third vertical partition wall 34*c* is close to or facing the inner wall of the casing 12, and an intermediate (or the second) vertical partition wall 34*c* is positioned between the first and the third vertical partition walls 34*c*, and these vertical partition walls are placed at equal intervals (pitches). These vertical partition wall 34*c* are connected or joined to the inner wall of the casing 12 without traversing the central portion of the casing 12. A partition wall (central partition wall) positioned at the center of the horizontal partition walls 35*c* having the number n=5 (odd number) of partition walls reaches the inner wall of the casing 12, both end portions of the two horizontal partition walls (intermediate partition wall) 35*c* adjacent to the central horizontal partition wall are connected or joined to the third vertical partition walls 34*c* close to the inner wall of the casing 12 (in FIG. 5 (*c*), two vertical partition walls located at left and right sides) among the vertical partition walls 34*c* of n+1=6 (even number) without reaching the inner wall of the casing 12. Further, both end portions of two horizontal partition walls (near partition walls) 35*c* facing the inner wall of the casing 12 and near the inner wall (in FIG. 5 (*c*), the two horizontal partition walls positioned at upper and lower portions) among the horizontal partition walls are connected or joined to the second vertical partition walls 34*c* among the vertical partition walls 34*c* having the number n+1 of partition walls without reaching the inner wall of the casing 12. That is, among the extending partition walls 37*c* of the odd number of horizontal partition walls 35*c*, extending partition walls 37*c* having a short length to the inner wall of the casing 12*a* (in FIG. 5 (*c*), extending partition walls 37*c* corresponding to the intermediate and the near horizontal partition wall and having a short length to the casing 12) are absent or open to avoid forming a narrow flow path in association with the inner wall of the casing 12.

Further, the structure of the circumferential division wall is not particularly limited to a specific one, and the end portions of the vertical and horizontal partition walls may be absent or open (or removed) in order to form a circumferential division wall group having no narrow flow path. For example, as shown in FIG. 5(*d*), in a lattice structure similar to that of FIG. 5(*c*) formed by horizontal partition walls of n=5 and vertical partition walls of n+1=6, the plural (in this example, two) first vertical partition walls 34*d* positioned in the central region among the vertical partition walls 34*d* of n+1=6, and the horizontal partition walls 35*d* of n=5 are connected or bonded to the inner wall of the casing 12, respectively; both side portions (both end portions) of the second vertical partition walls (intermediate vertical partition walls) 34*d* each adjacent to the first vertical partition walls are connected or joined to two horizontal partition walls (near partition wall) 35*d* close to or facing the inner wall of the casing 12 among the horizontal partition walls 35*d* without reaching the inner wall of the casing 12; and both side portions of the third vertical partition walls 34*d* each adjacent to the second vertical partition walls (intermediate vertical partition walls) and close to or facing the inner wall of the casing 12 are connected or joined to two horizontal partition walls (intermediate horizontal partition walls) 35*d* adjacent to the central horizontal partition wall among the horizontal partition walls 35*d* having the number n=5 (odd number) of partition walls without reaching the inner wall of the casing 12. That is, in this configuration, extending partition walls 37*d* of the second vertical partition walls (intermediate vertical partition walls) 34*d* and those of the third vertical partition wall 34*d* are absent.

Similarly to the examples mentioned above, in FIGS. 5(*a*) to (*d*), the partition walls with an even number of partition walls are formed without traversing (or crossing) the central portion of the casing, and the central partition wall among the partition walls having an odd number of partition walls is formed to traverse the central portion of the casing. Even such a division wall structure achieves a high rectifying action or function similar to the above-mentioned lattice structure. Moreover, since the inner wall of the casing, the vertical partition wall, and the horizontal partition wall form a non-lattice division wall unit having a larger flow path diameter, the fluid can stably be rectified for a long period of time, and the rectifying element can also be prevented from clogging.

The division wall structures (the same or similar division wall structures) of the adjacent rectifying elements may be overlapped with each other when viewed from an axial direction of a nozzle body in a state where the division wall structures are circumferentially displaced (in particular, circumferentially displaced at an angle of 90°). In order to improve the rectifying action or function on the fluid, it is preferred to have division walls (partition walls) or division wall structures which do not overlap each other. The vertical partition walls and the horizontal partition walls (for example, an even number of partition walls and an odd number of partition walls) may have a wall crossing or traversing the central portion of the fluid flow path (casing). The partition walls with an even number of partition walls may be formed with the same or different pitch (in particular, the same pitch), avoiding the central portion without crossing the central portion of the fluid flow path or casing (in particular, a cylindrical casing). Further, the central partition wall among the partition walls having an odd number of partition walls may be formed traversing or crossing the central portion of the fluid flow path (or casing).

In a preferred embodiment, in the vertical partition walls and/or the horizontal partition walls (preferably, partition walls with the number n of partition walls and/or partition walls with the number n+1 of partition walls, or an even number of partition walls and/or an odd number of partition walls), a partition wall (one or more partition walls) at least positioned at the central region (or inside region) is connected and bonded to the inner wall of the casing; among the vertical partition walls and the horizontal partition walls, both end portions of at least one partition wall (for example, a partition wall which is positioned near the inner wall of the casing and is at least close to or faces the inner wall of the casing) positioned at the side region (in particular, both side regions) may be connected or joined to the intersecting partition wall or division wall without reaching the inner wall of the casing.

In order to avoid the formation of a narrow flow path, a preferred lattice structure may have the following configuration (a-1) or (a-2): (a-1) as described above, the horizontal partition walls and the vertical partition walls are different in the number of partition walls (the number of partition walls in the horizontal partition walls and that in the vertical partition walls) from each other at the same pitch; (a-2) the horizontal partition walls and the vertical partition walls have a large density near the center portion of the fluid flow path (for example, the horizontal partition walls and the vertical partition walls are formed so as to have a smaller pitch toward the center portion), and have the same or different number of partition walls (the number of partition walls in the horizontal partition walls and that in the vertical partition walls are the same or different from each other). In the embodiment (a-2), the density of the division unit (or flow path unit) of the circumferential division wall may be made sparse as compared with the division unit (or flow path unit) of the inside division wall by the following configuration: a configuration in which the vertical and horizontal partition walls formed at the same pitch are positioned in the central region (or inside region) of the casing (in a configuration in which the vertical and horizontal partition walls are concentrated or shifted in the central region (or inside region) of the casing); a configuration in which the vertical and horizontal partition walls are placed at a pitch P that is sequentially smaller toward the center portion of the casing; or other configurations. For example, the partition walls with an even number of partition walls may be connected (bonded or joined) to the inner wall of the casing without crossing the central portion of the fluid flow path (or casing); and in the partition walls with an odd number of partition walls, the central partition wall may traverse or cross the central portion of the fluid flow path (or casing) and be connected (joined or bonded) to the inner wall of the casing. Moreover, the embodiment (a-2) may be as follows: assuming that the horizontal partition walls and the vertical partition walls equally dividing the inner diameter (fluid flow path) D of the casing are formed with reference to the axial center (center) of the casing, both side portions or both side regions in the horizontal partition walls and/or the vertical partition walls are absent; and/or the horizontal partition walls and the vertical partition walls have a smaller pitch near the central portion of the casing (or fluid flow path) (or a pitch that is sequentially smaller toward the center). As the embodiment (a-2), when the horizontal partition walls and the vertical partition walls are different in the number of partition walls, the respective division walls can be prevented from overlapping as viewed from an axial direction of a nozzle body to improve the rectifying function.

For example, in an example shown in FIG. 5(*e*), four vertical partition walls 34*e* and five horizontal partition walls 35*e* extend in the vertical and horizontal directions, respectively, to form a lattice structure. The partition walls (vertical partition walls) 34*e* with an even number of partition walls are connected or bonded to the inner wall of the casing 12 without traversing the central portion of the casing 12 and that of the fluid flow path. The central partition wall among the partition walls (horizontal partition walls) 35*e* with an odd number of partition walls traverses the central portion (or axial center portion) of the casing 12 and that of the fluid flow path, and the partition walls in the central region (or inside region) among the odd number of partition walls (horizontal partition walls) 35*e*, including the central partition wall, traverse the central portion of the casing 12 and that of the fluid flow path and reaches the inner wall of the casing 12. Further, in the vertical and horizontal directions, the vertical and horizontal partition walls 34*e* and 35*e* are each formed to be shifted in the center (or central region) of the casing 12 (or be concentrated near the center of the casing 12) with the same pitch.

In an example shown in FIG. 5(*f*), similar to the division wall structure shown in the FIG. 5(*e*) except that three vertical partition walls 34*f* and four horizontal partition walls 35*f* extend in the vertical and horizontal directions, respectively, to form a lattice structure, the vertical and horizontal partition walls 34*f* and 35*f* are each formed to be concentrated in the central region (or inside region) of the casing 12 (the partition walls are biased or shifted to the central portion of the casing 12) with the same pitch.

Even in such a lattice structure, the formation of a narrow flow path can be avoided. In addition, as viewed from an axial direction of a nozzle body, the adjacent rectifying elements can sequentially subdivide a fluid from upstream without overlapping of the division walls and achieve a high rectifying function, and clogging of the circumferential division wall group can be prevented.

In a configuration in which the vertical and horizontal partition walls are each displaced or biased to the central region (or inside region) of the casing, the vertical and horizontal partition walls may not necessarily need to be each formed with the same pitch, and may be arranged or formed with a pitch sequentially smaller toward the central portion of the casing.

[Lattice Structure Having Narrow Flow Path]

The above-mentioned examples show one or adjacent rectifying elements having a division wall structure with no narrow division wall (or narrow flow path). Even if the rectifying element(s) has a narrow division wall, a high rectifying function is achieved when the rectifying elements are adjacent to each other with no overlap of the division walls (or partition walls) of one rectifying element with those of the other rectifying element as viewed from the axial direction.

For example, a lattice structure shown in FIG. 6(*a*) has a configuration in which vertical partition walls 44*a* of n+1=4 and horizontal partition walls 45*a* of n=3 are arranged with the same pitch and extend in the vertical and horizontal directions to reach the inner wall of the casing 12. A lattice structure shown in FIG. 6(*b*) has a configuration in which vertical partition walls 44*b* of n=4 and horizontal partition walls 45*b* of n+1=5 are arranged with the same pitch and extend in the vertical and horizontal directions to reach the inner wall of the casing 12. A lattice structure shown in FIG. 6(*c*) has a configuration in which vertical partition walls 44*c* of n+1=6 and horizontal partition walls 45*c* of n=5 are arranged with the same pitch and extend in the vertical and horizontal directions to reach the inner wall of the casing 12. Moreover, similarly to the embodiments mentioned above, the partition walls with an even number of partition walls (in FIGS. 6(*a*) to (*c*), the vertical partition walls 44*a* to 44*c*) are formed without traversing the central portion of the casing 12 and that of the fluid flow path, and the central partition wall among the partition walls with an odd number of partition walls (in FIGS. 6(*a*) to (*c*), the horizontal partition walls 45*a* to 45*c*) are formed so as to traverse the central portion of casing 12 and that of the fluid flow path. Further, among the peripheral division wall group, extending partition walls 47*a* to 47*c* extending from the inner wall of the casing 12 to the vertical and horizontal partition walls 44*a* to 44*c*, 45*a* to 45*c* of the inside division wall group are not absent or open, so that narrow division walls defined with the inner wall of the casing 12 and the vertical and horizontal partition walls (extending partition walls) are formed in the vertical and horizontal directions, and narrow flow paths in which flow paths are narrowed are formed.

Even if the adjacent rectifying elements have such narrow division walls, the displacement of the adjacent rectifying elements in a circumferential direction (in this example, the displacement at an angle of 90° in the circumferential direction) eliminates overlapping of the division walls (or partition walls) in the adjacent rectifying elements as viewed from an axial direction of a nozzle body, and an intersection of division wall units of one rectifying element is positioned within a flow path unit formed by a division wall unit of the other rectifying element. Thus, a fluid from upstream can be subdivided or split sequentially into four flows per division wall unit of the inside division wall group and three or more flows per division wall unit of the circumferential division wall group, which achieves an improved rectifying function.

In the above-mentioned examples, the rectifying lattices having the same lattice structure are installed adjacently in the axial direction of the fluid flow path in a state in which these rectifying lattices are circumferentially displaced from each other. The adjacent rectifying lattices may have a lattice structure different from each other regardless of the presence or absence of a narrow flow path, or the adjacent rectifying lattices may be installed in the fluid flow path with or without circumferential displacement from each other. For example, by forming horizontal partition walls and vertical partition walls of one of two adjacent rectification lattices at different positions alternately in X-axis direction and Y-axis direction from those of the other rectification lattice, an intersection of the division walls of one rectifying element may be positioned within a flow path unit formed by the division walls of the other rectifying lattice (in particular, in a central region of a quadrilateral flow path unit) without circumferentially displacing the two adjacent rectifying lattices from each other. Moreover, the adjacent rectifying lattices may have a lattice structure similar to each other, for example, a lattice structure having division walls in a quadrilateral form different in size (a square form different in size, a rectangular form different in length of short axis and/or long axis). Even in a case where the rectifying lattices having such a form are disposed in the fluid flow path in a state in which the rectifying lattices are adjacent to each other and if necessary are circumferentially displaced from each other, a fluid from upstream can effectively be subdivided and rectified.

Regardless of the presence or absence of a narrow flow path, in the lattice structure, partition walls having a larger number of partition walls may have a pitch P substantially equally dividing an inner diameter (fluid flow path) D of a casing [P=D/(n+2)], and the partition walls having a smaller number of partition walls may have a pitch substantially the same as the pitch P with an axial center of the casing (fluid flow path) as a center; except for the configuration in which the density of the horizontal partition walls and that of the vertical partition walls are larger near the center of the fluid flow path and the horizontal partition walls and the vertical partition walls have the same or different number of partition walls (e.g., embodiments shown in FIG. 5(*e*) and FIG. 5(*f*)).

When the rectifying element having a lattice structure is disposed or installed in a rectifying flow path of a nozzle body and a fluid is jetted from an orifice having an anisotropic form (for example, an orifice having a long and narrow or elliptical form (an oval form), a jet performance (for example, collision force performance) may be reduced depending on the direction (or the rotational position) of the partition walls of the rectifying lattice relative to the long axis of the orifice. That is, a flow rate distribution may be anisotropic. In such a case, the fluid is subdivided into a plurality of flows (for example, four or more flows) by upstream division walls and the subdivided fluid is further subdivided into a plurality of flows (for example, four or more flows) by downstream division walls, so that the flow rate distribution can be made uniform, the anisotropy can be reduced, and the collision force performance can be improved, while preventing the adverse effect due to the positional relationship with the orifice. In particular, a rectifying lattice having no narrow flow path, especially a rectifying lattice having no narrow flow path in a peripheral division wall group, allows further reduction of the anisotropy and improvement of the collision force performance. Moreover, the rectifying lattice is advantageous for improving the collision force at an opening area ratio in a wide range in comparison with a rectifying element having a non-lattice division wall structure.

[Non-Lattice Structure]

The division wall structure is not limited to a lattice division wall structure, and may be a non-lattice (or non-latticed) division wall structure (non-lattice structure). A plurality of rectifying elements having a non-lattice structure may also be circumferentially displaced from each other if necessary, and can be disposed or installed adjacently in an axial direction in a fluid flow path. In the adjacent rectifying elements, the non-lattice structure may be the same or similar or different.

The rectifying element having a non-lattice structure may be formed with (b) a division wall group which comprises: a plurality of polygonal-shaped division walls adjacent to each other to form an inside division wall group (inside flow path unit group) (e.g., a honeycomb-shaped inside division wall group), and extending partition walls (or radial walls) traversing the polygonal-shaped division walls in the radial directions or extending from the circumferential walls of the polygonal-shaped division walls in the radial directions to reach the inner wall of the casing. Each radial wall may traverse a polygonal-shaped division wall in a radial direction, for example, may diagonally cross a lattice or quadrilateral division wall. The radial walls usually radially extend from the circumferential walls (or outer circumferential walls) of the polygonal-shaped division walls, for example, may radially extend from corner portions (or corners) of the circumferential walls of the polygonal-shaped division walls.

For example, as shown in FIG. 7, an inside division wall group 59 is formed with a honeycomb-shaped division wall group which comprises plural (two or more) hexagonal division walls or division wall units 56 being radially and circumferentially adjacent to each other; radial walls or extending partition walls (in this example, 12 extending partition walls) 57 radially extending from the circumferential walls of the honeycomb-shaped inside division wall group 59 are connected to the inner wall of the casing 12. In this example, among plural hexagonal division walls facing the inner wall of the casing 12, in hexagonal division walls circumferentially adjacent to each other, the extending partition walls (radial walls) 57 radially extend from each of a middle portion (or a middle point or a midpoint) of a partition wall 55 of one hexagonal division wall unit 56 and a vertex or peak portion (or a vertex) of the adjacent other hexagonal division wall 56. Even if the division wall group has such a honeycomb structure, since the extending partition walls 57 radially extend with a circumferential interval (pitch) larger than the length of the partition wall 55 of the honeycomb-shaped division wall 56, a circumferential division wall group (or peripheral division wall group) 58 can be formed in association with the inner wall of the casing 12 (or can be formed with the partition walls 55 of the hexagonal division walls 56, the inner wall of the casing 12, and the extending partition walls 57) without narrow division wall.

The extending partition walls do not need to extend alternately from a middle portion of a partition wall of one of adjacent hexagonal division walls and a vertex portion of a partition wall of the other hexagonal division wall; in the circumferential direction of the honeycomb-shaped inside division wall group, the extending partition walls may extend from middle portions and/or vertex portions of the partition walls of the hexagonal division walls.

Moreover, it is preferred that the inside division wall group be formed with regularly arranged division walls. As described above, the configuration of the inside division wall group is not limited to the honeycomb-shaped configuration (hexagonal or other division walls forming the honeycomb-shaped division wall group), and may be the configuration of the polygonal-shaped inside division wall group of the embodiment (a), for example, the configuration of quadrilateral division walls forming a lattice division wall group.

The division wall structure may be formed asymmetrically with respect to the X-axis and/or the Y-axis as a central axis. In order to make the rectifying function on the fluid uniform, it is preferred to form the division wall structure in a symmetrical shape (line-symmetric shape).

The division wall structure can also be formed with plural partition walls (radial walls) radially extending in the radial directions of the casing. However, one radial partition wall can only divide or split a fluid from upstream into two flows. Thus, it is difficult to improve the rectifying function. In contrast, combining one or more annular walls with radial partition walls (radial walls) extending in the radial directions at circumferentially different positions can divide or subdivide the fluid from upstream into three or more flows and can greatly improve the rectifying function. Thus, compared with the above-mentioned (b) honeycomb-shaped division wall structure, a division wall structure of the following embodiment (c) is preferred.

The division wall structure of the embodiment (c) may be formed with a division wall group containing: one or more concentric polygonal-shaped (for example, a polygonal-shaped such as triangular, quadrilateral, pentagonal, hexagonal, octagonal) or concentric ring-shaped (or circular) annular walls; plural intermediate radial walls which radially extend at circumferentially different positions to connect the annular walls adjacent to each other in at least the radial direction; and plural extending partition walls radially extending from the outermost annular wall to reach the inner wall of the casing at positions different from the intermediate radial walls in the circumferential direction. For a division wall structure including one annular wall, an inner wall of a casing can be regarded as an annular wall, and one annular wall and the inner wall of the casing can form two adjacent annular walls. In such a division wall structure, the radial walls may be formed in various configurations at circumferentially different positions in association with the annular wall, and the radial walls may have innermost radial walls radially spreading and extending from the central portion of the innermost annular wall in the radial directions to reach the innermost annular wall, and/or radial walls radially extending at the same positions in the circumferential direction. From the outermost annular wall, extending partition walls radially extending to reach the inner wall of the casing may be formed with intervals in the circumferential direction, and the extending partition walls may form outer radial walls. The intermediate radial walls may be formed with equal intervals in the circumferential direction in each annular wall with the axial center of the casing as a center. The intermediate radial walls of the adjacent annular walls may alternately extend in the radial directions with equal intervals in the circumferential direction.

A division wall structure shown in FIG. 8(*a*) has an inside division wall group 69*a* which includes: plural octagonal annular walls (in this example, three octagonal annular walls) 61*a*, 62*a*, 63*a* formed concentrically with the same radial interval or distance (or with the same interval in the radial direction), and intermediate radial walls 65*a*, 66*a* connecting the annular walls adjacent to each other at different positions in the circumferential direction sequentially. In this example, the inside division wall group 69*a* includes: a first octagonal annular wall 61*a* as the innermost annular wall; a second octagonal annular wall 62*a* adjacent to the first octagonal annular wall 61*a*; a third octagonal annular wall 63*a* adjacent to the second octagonal annular wall 62*a*; eight first intermediate radial walls 65*a* each extending from a corner of the first octagonal annular wall 61*a* to the corresponding corner of the second octagonal annular wall 62*a* with the same interval (pitch) in the circumferential direction; and eight second intermediate radial walls 66*a* each extending from a central region of a partition wall 64 of the second octagonal annular wall 62*a* to the corresponding central region of a partition wall 64 of the third octagonal annular wall 63*a* at a different position from the first intermediate radial walls in the circumferential direction. The inside division wall group 69*a* contains bent trapezoidal division walls similar in shape. Further, eight extending partition walls (outer radial walls) 67*a* each extend from a corner of the outermost third octagonal annular wall 63*a* to reach the inner wall of the casing 12, to form a peripheral division wall group 68*a*.

As described above, the inside division wall group may be formed with polygonal-shaped annular walls, for example, triangular, quadrilateral, pentagonal, hexagonal, or other annular walls (for example, hexagonal- to dodecagonal annular walls) instead of the octagonal annular walls. Moreover, the intermediate radial walls and the extending partition walls may radially extend from the partition walls forming the annular wall without limitation to the corners of the polygonal-shaped annular wall.

A division wall structure shown in FIG. 8(*b*) has an inside division wall group 69*b* comprising: plural concentric circular annular walls (in this example, three concentric annular walls) 61*b*, 62*b*, 63*b* formed with the same radial interval, and radial walls 64*b*, 65*b*, 66*b* connecting the adjacent annular walls at different positions in the circumferential direction. The inside division wall group 69*b* is formed of division walls containing annular sector (or fan-shaped) division walls which are similar in shape and are radially and circumferentially adjacent to each other. In this example, the inside division wall group 69*b* comprises: plural (in this example, two) first radial walls (or reference radial walls) 64*b* traversing the center of the three annular walls in a linear manner (or extending from the center) to reach the inner wall of the casing 12; plural (in this example, four) second radial walls 65*b* each of which is perpendicular to the first radial walls and extends from a first annular wall 61*b* as the innermost annular wall to reach the inner wall of the casing 12 through a third annular wall 63*b* as the outermost annular wall; plural (in this example, four) third radial walls 66*b* each of which is positioned between the first radial walls 64*b* and the second radial walls 65*b* in the circumferential direction and extends from the second annular wall 62*b* to reach the inner wall of the casing 12 through the adjacent third annular wall 63*b*; and plural (in this example, eight) extending partition walls (radial walls) 67*b* each of which is positioned between the first and second radial walls 64*b*, 65*b* and the third radial walls 66*b* in the circumferential direction and extends from the third annular wall 63*b* to reach the inner wall of the casing 12. The first radial walls 64*b* traversing the innermost first annular wall 61*b* form the innermost radial walls; and the second radial walls 65*b* and the third radial walls 66*b* by which the first annular wall 61*b*, the second annular wall 62*b* and the outermost third annular wall 63*b* are sequentially or successively connected to form intermediate radial walls. The partition walls which connect the outermost third annular wall 63*b* to the inner wall of the casing 12 form extending partition walls (outer radial walls) 67*b*. The outermost third annular wall 63*b*, the inner wall of the casing 12, and the extending partition walls (radial walls) 67*b* form a peripheral division wall group 68*b*.

According to the division wall structure having such a configuration, the radial walls arranged at different positions in the circumferential direction can subdivide and divide a fluid to improve the rectifying function. Further, since the circumferential division wall group has no narrow division wall, the generation of the turbulent flow due to the inner wall of the casing can be prevented, and clogging due to foreign matters can be prevented.

In a division wall structure as shown in FIG. 9(*a*), an inside division wall group 79*a* comprises one annular wall (partition wall) 71*a* concentrically disposed in the casing 12, and plural first radial walls (innermost radial walls) 74*a* radially extending in the radial directions to divide the annular wall in the circumferential direction from the center with equal intervals (equal angles); and a peripheral division wall group 78*a* comprises plural extending partition walls (intermediate or second radial walls) 77*a* radially extending from the annular wall 71*a* to reach the inner wall of the casing 12 at different positions from the first radial walls in the circumferential direction and with equal intervals. This example shows: as the first radial walls 74*a*, six radial walls (inside radial partition walls which are formed of three cross walls traversing the center of the annular wall 71*a* and radially extend at an angle of 60° in the circumferential direction) 74*a* radially extending from the center; and as the extending partition walls (second radial walls) 77*a*, ten radially extending radial walls (extending partition walls; intermediate radial walls radially extending at an angle of 36° in the circumferential direction). In the illustrated example, a first rectifying element and a second rectifying element are installed while being displaced at an angle of 30° in the circumferential direction; and in the circumferential direction, the first radial walls 74*a* and the extending partition walls (second radial walls) 77*a* are formed in a positional relationship in which one predetermined radial wall among the first radial walls 74*a* is positioned between adjacent predetermined extending partition walls (between extending partition walls facing each other with reference to the center) among the extending partition walls (second radial walls) 77*a*. The division wall structure shown in FIG. 9(*a*) has the same overlapping (super position) structure even when the two rectifying elements are displaced from each other in the circumferential direction at an angle of 90°.

In a preferred embodiment, a plurality of annular walls is concentrically formed in a casing. In a division wall structure shown in FIG. 9(*b*), an inside division wall group 79*b* comprises plural annular walls (partition walls) 71*b*, 72*b* concentrically disposed in the casing 12, plural first radial walls (innermost radial walls) 74*b* dividing the first annular wall 71*b* as the innermost annular wall among the plural annular walls with equal intervals in the circumferential direction, and plural second radial walls (intermediate radial walls) 75*b* dividing a space between the first annular wall 71*b* and the second annular wall 72*b* with equal intervals in the circumferential direction at different positions from the first radial walls in the circumferential direction; a peripheral division wall group 78*b* comprises plural extending partition walls (outer or third radial walls) 77*b* radially extending from the second annular wall 72*b* to reach the inner wall of the casing 12 with equal intervals in the circumferential direction at different positions from the second radial walls 75*b* in the circumferential direction. This example shows: the two annular walls 71*b*, 72*b* being concentrically arranged; as the first radial walls 74*b*, three radially extending radial walls (three radial walls which traverse the center of the first annular wall and radially extend at intervals of 120°); and as the second radial walls 75*b* and the extending partition walls (third radial walls) 77*b*, five radial walls radially extending at intervals of 72°. In this example, a first rectifying element and a second rectifying element are installed in a state of being displaced from each other at an angle of 180° in the circumferential direction.

In a division wall structure shown in FIG. 9(*c*), two annular walls (partition walls) 71*c*, 72*c* are concentrically disposed in the casing 12. The division wall structure comprises: two first radial walls (innermost radial walls) 74*c* which traverse the center of the first annular wall 71*c* located at the central area and radially extend in a linear manner; six second radial walls (intermediate radial walls) 75*c* which radially extend to divide or partition a space between the first annular wall 71*c* and the second annular wall 72*c* with the same interval (pitch) at an angle position of 60° in the circumferential direction, at different positions from the first radial walls in the circumferential direction; and ten extending partition walls (outer or third radial walls) 77*c* which radially extend to divide or partition a space between the second annular wall 72*c* and the inner wall of the casing 12 with the same interval (pitch) at an angle position of 36° in the circumferential direction, at different positions from the second radial walls in the circumferential direction. In this example, a first rectifying element and a second rectifying element are installed in a state of being displaced from each other at an angle of 90° in the circumferential direction.

A division wall structure shown in FIG. 9(*d*) comprises: five first radial walls (innermost radial walls) 74*d* radially extending at an angle of 72° from the center of a first annular wall (partition wall) 71*d* located at the central area; nine second radial walls (intermediate radial walls) 75*d* which radially extend to divide or partition a space between the first annular wall 71*d* and a second annular wall 72*d* with the same interval (pitch) at an angle position of 40° in the circumferential direction, at different positions from the first radial walls in the circumferential direction; and nine extending partition walls (outer or third radial walls) 77*d* which radially extend to divide or partition a space between the second annular wall 72*d* and the inner wall of the casing 12 with the same interval (pitch) at an angle of 40° in the circumferential direction, at different positions from the second radial walls in the circumferential direction. In this example, a first rectifying element and a second rectifying element are installed in a state of being displaced from each other at an angle of 180° in the circumferential direction.

A division wall structure shown in FIG. 9(*e*) comprises: three annular walls (partition walls) 71*e*, 72*e*, 73*e* concentrically arranged in the casing 12, without division of a flow path formed in the first annular wall 71*e* at the central area; five first radial walls (first intermediate radial walls) 75*e* which radially extend to divide or partition a space between the first annular wall 71*e* and the second annular wall (intermediate annular wall) 72*e* at an angle of 72° in the circumferential direction; seven second radial walls (second intermediate radial walls) 76*e* which radially extend to divide or partition a space between the second annular wall 72*e* and the third annular wall (outermost annular wall) 73*e* at an angle of about 51° in the circumferential direction, at different positions from the first radial walls in the circumferential direction; and nine extending partition walls (outer or third radial walls) 77*e* which radially extend to divide or partition a space between the third annular wall 73*e* and the inner wall of the casing 12 at an angle of 40° in the circumferential direction, at different positions from the second radial walls (partition walls) 76*e* in the circumferential direction. In this example, a first rectifying element and a second rectifying element are installed in a state of being displaced from each other at an angle of 180° in the circumferential direction.

The plural rectifying elements having such a non-lattice structure can also be disposed or installed adjacently in an axial direction of a fluid flow path with or without the displacement in the circumferential direction. In the examples shown in the FIG. 9, since each radius of one or more annular walls in one of the two adjacent rectifying elements is the same as that of one or more annular walls in the other rectifying element, a division wall (radial wall) of one rectifying element is positioned in a flow path unit (for example, an annular sector flow path) formed by division walls of the other rectifying element. In contrast, by forming annular walls different in radius from each other in one rectifying element and the other rectifying element and forming radial walls at different positions from each other in the circumferential direction if necessary, an intersection of division walls and/or a division wall (a radial wall) of one rectifying element may be positioned in a flow path unit (in particular, in a central portion of the flow path unit or a central portion thereof in the circumferential direction) formed with division walls in the other rectifying element. For example, one or more annular walls in one rectifying element may be formed with radially spaced (preferably at equal intervals) with respect to one or more annular walls in the other rectifying element. Further, if necessary, radial walls in one rectifying element may be formed at different positions in the circumferential direction with respect to a plurality of radial walls in the other rectifying element. Moreover, the adjacent rectifying elements may have a division wall structure having a structure similar to each other, for example, a fan-shaped division wall having a different size (a fan-shaped division wall having a different length in radial direction and/or a different length in circumferential direction). In a case where the rectifying elements in such a form are disposed adjacently to each other in a fluid flow path in a state in which if necessary these rectifying elements are circumferentially displaced from each other, the fluid from upstream can be subdivided and rectified more effectively. Further, even in the rectifying element having a non-lattice structure, since the extending partition walls can be formed in a radially spread configuration in the rectifying element having no narrow flow path, especially in the rectifying element having no narrow flow path in a peripheral division wall group, an anisotropy of a flow rate distribution can be further reduced, and a collision force performance can be improved.

In a preferred embodiment, a non-lattice division wall structure may comprise plural intermediate radial walls (plural intermediate radial walls which divide an annular flow path at intervals in a circumferential direction) and plural outer radial walls (extending partition walls); the intermediate radial walls radially extend to connect plural annular walls adjacent to each other in the radial direction with different positions in the circumferential direction sequentially (in particular, at equal intervals or at equal angles in the circumferential direction) outwardly in the radial directions from the center of the innermost annular wall as an axial center, and the outer radial walls extend from the outermost annular wall to reach the inner wall of the casing at different positions in the circumferential direction from the intermediate radial walls extending from the adjacent annular walls (in particular, at equal intervals or at equal angles in the circumferential direction). The non-lattice division wall structure may further comprise plural innermost radial walls (plural innermost radial walls extending toward the center of the innermost annular wall to converge at the center) radially spreading from the center of the innermost annular wall (in particular, at equal intervals or at equal angles in the circumferential direction) to reach the innermost annular wall at different positions in the circumferential direction from the extending positions of the intermediate radial walls in the innermost annular wall.

[Division Wall Structure]

The division walls in the embodiments (a) to (c) can be variously modified, and the division wall structure (circumferential division wall group and inside division wall group) may be formed with a partition wall (a partition wall of which face extends in an axial direction) extending vertically and horizontally, circumferentially, and/or radially. The division wall structure can be formed by a division wall unit extending in the axial direction of the casing and forming a flow path unit, and each division wall unit can be formed with a division wall and a partition wall of various forms, for example, a basic division wall unit in a polygonal shape, a partition wall extending in the circumferential direction (a partition wall in an annular shape such as a polygonal ring, a circular ring, and an oval or elliptical ring), and a radially extending partition wall (for example, a radial wall). The configuration of the division wall unit formed by these basic division wall units and partition walls is not particularly limited to a specific one. For example, the frame shape of the division wall unit may include a polygonal shape such as a triangular shape, a quadrilateral shape (a rectangular shape including a square shape, an oblong shape, and a rhombus shape), and a hexagonal shape; an annular shape such as a polygonal ring, a circular ring, and an oval or elliptical ring; a shape in which a ring such as a polygonal ring and a circular ring is divided in the radial directions; a shape in which rings adjacent to each other in the radial direction are divided in the radial direction. The peripheral division wall group may have a curved wall corresponding to the cylindrical inner wall of the casing.

The division wall structure may comprise a circumferential division wall group (a plurality of circumferential division wall units) which is adjacent to the inner wall of the casing in the circumferential direction to form a circumferential flow path unit group (a plurality of circumferential flow path units) of the circumferential region of the fluid flow path, and an inside division wall group (a plurality of inside division wall units) which is adjacent to the circumferential flow path unit group to form an inside flow path unit group (a plurality of inside flow path units) of the inside region of the fluid flow path.

The circumferential division wall group comprises at least a peripheral division wall group, and may be provided with a division wall group in which the peripheral division wall group is adjacent in an inward direction (radial direction) in the form of double, triple, or other annular shapes (such as a concentric polygonal shape and concentric circular shape). A preferred circumferential division wall group can comprise a peripheral division wall group (or division wall unit group) formed with a plurality of peripheral division walls (for example, non-lattice division wall units formed in association with the inner wall of the casing) which contact with the inner wall of the casing and are positioned adjacently in the circumferential direction.

Moreover, in the rectifying lattice, among the horizontal and vertical partition walls forming the peripheral division wall, at least one partition wall close to or facing the inner wall of the casing may have at least one end (preferably both ends) which does not reach the inner wall of the casing and which is connected or joined to the other partition wall or division wall; said at least one partition wall close to or facing the inner wall of the casing preferably includes partition walls of left and right portions (both sides) and/or upper and lower portions (or partition walls in both side regions), or a partition wall forming a non-lattice division wall in relation to the inner wall of the casing. The peripheral division wall group may comprise plural extending partition walls (extending division walls) which extend from plural division wall units of the inside division wall group to reach the inner wall of the casing and form division wall units (non-lattice division wall units) in association with the inner wall of the casing. The division wall structure of each rectifying element may have a configuration in which, among the extending partition walls (extending division walls), an extending partition wall having a short length to the inner wall of the casing (preferably at least an extending partition wall having the shortest length) is absent or open. At least the longest extending partition wall is bonded to the inner wall of the casing without absence.

The circumferential division wall group and the inside division wall group may be formed of division walls disposed irregularly or randomly. It is preferred that at least the inside division wall group be usually formed of regularly arranged or disposed division walls (in particular, division walls having a similar or the same shape, for example, division walls having the same shape).

The division wall structure (the circumferential division wall group and the inside division wall group), in particular, at least the inside division wall group, may be formed of division walls having a similar or the same shape, for example, (a) a plurality of polygonal-shaped division wall units (or basic division wall unit group) adjacent to each other. For example, the division walls may have a form such as a polygonal form or pattern in which triangular division walls are adjacent to each other, a lattice or grid form, a honeycomb form. Without limitation to the same-shaped division walls, the division walls may have a similar shape or pattern, for example, a shape of a combination of a triangle with a quadrangle, and a rhombus shape. Moreover, the inside division wall group may be formed of plural division wall units (division wall unit group) regularly arranged or disposed with a predetermined pitch adjacently to each other, and the inside division wall group may be formed of division wall units having the same or identical flow path diameter.

In the embodiment (a), preferably, in each of the rectifying elements, at least the inside division wall group (in particular, the whole division wall structure also containing a peripheral division wall group) has division walls having a similar or the same shape or pattern (for example, lattice or grid division walls formed of partition walls extending in vertical and horizontal directions). For example, the lattice or grid structure has a lattice division wall structure (lattice structure) which includes plural vertical partition walls extending in the vertical direction (Y-axis direction) to divide a fluid flow path with a predetermined pitch in the X-axis direction as the horizontal direction, and plural horizontal partition walls extending in the horizontal direction (X-axis direction) to divide the fluid flow path with a predetermined pitch in the Y-axis direction as the vertical direction. In such a division wall structure, the number of horizontal partition walls and the number of vertical partition walls may be the same or different from each other. The number of horizontal partition walls and the number of vertical partition walls may be each selected from a range of, for example, about 2 to 10, preferably about 3 to 6, and more preferably about 4 to 6. An excessive small number of partition walls easily decrease a rectifying function. An excessive large number of partition walls increase a pressure loss and reduce an opening area, easily lowering an impact force of a fluid.

The horizontal partition walls and the vertical partition walls may have the same number of partition walls as long as a narrow division wall is not formed between the inner wall of the casing and the vertical and horizontal partition walls (extending partition walls), that is, as long as a narrow flow path in which a flow path is narrowed is formed by a narrow division wall. Moreover, even if a rectifying element having a narrow flow path in which a flow path is narrowed by a narrow division wall is used, the horizontal partition walls and the vertical partition walls may have the same number of partition walls as long as the plural rectifying elements can be disposed in a configuration in which the division walls (or partition walls) of one rectifying element are not overlapped with the division walls (or partition walls) of the other rectifying element as viewed from the axial direction.

The horizontal partition walls and the vertical partition walls which have a different number of partition walls may have division walls (partition walls) with a relationship of an odd number and an odd number or a relationship of an even number and an even number, and particularly, may have division walls (partition walls) with a relationship of an odd number and an even number. For example, the number n of partition walls in either one of the horizontal partition walls and the vertical partition walls is an odd number (for example, 3, 5, 7), and the number m of partition walls in the other partition walls may be an even number (for example, 2, 4, 6, 8). Specifically, when the number of partition walls in either one of the partition walls is n, the number of partition walls in the other partition walls is m, and a combination of these numbers is represented by n×m, the lattice structure may be formed in a relationship of n×m=2×3, 2×5, 3×4, 3×5, 4×5, 5×6, particularly, a relationship in which n is 3 to 5 and m is 4 to 6.

In a preferred embodiment, when the number of partition walls in either one of the horizontal partition walls and the vertical partition walls is n and the number of partition walls in the other partition walls is m, the lattice structure may be formed in a relationship m=n+1. The number n may be selected from a range of about 2 to 10 (for example, about 3 to 8) and may be preferably about 3 to 7, more preferably about 3 to 6, particularly about 3 to 5, and especially about 4 or 5.

Also in the lattice structure, the circumferential division wall group may be formed of a peripheral division wall group including plural division wall units (division wall unit group) contacting with the inner wall of the casing and being adjacent in the circumferential direction. The peripheral division wall group may include plural extending partition walls extending from plural partition walls of the inside division wall group to reach the inner wall of the casing. The extending partition walls may form a division wall unit (non-lattice division wall unit) in association with the inner wall of the casing.

Further, in the non-lattice division wall structure having the radial partition walls (radial walls) of the embodiments (b) and (c), at least an inside division wall group (in particular, a whole division wall structure further containing a peripheral division wall group) has division walls which have a similar or the same shape and are formed of substantially trapezoidal or annular sector partition walls adjacent at least in the circumferential direction, preferably in the circumferential and the radial directions, or division walls having a similar or the same shape, such as lattice division walls or honeycomb-shaped division walls. In the embodiment (c), the number of annular walls is preferably 1 or more, particularly preferably two or more, and may for example be 2 to 7, preferably 2 to 5, more preferably 2 to 4, and particularly 2 or 3. The plural annular walls may be formed with the same interval (pitch) in the radial direction, or the interval (pitch in the radial direction) of the annular walls may be smaller or larger from the central portion toward the radial direction. The radial walls (or hypothetical lines of the radially extending radial walls) may be formed to extend in the radial directions with or without traversing the center of the innermost annular wall. The number of intermediate radial walls (radial walls radially spreading from the center of the annular walls) which divide one annular flow path formed with the annular walls adjacent to each other is 2 or more (particularly 3 or more) depending on the number of annular walls or others, and may be selected from a range of about 4 to 20, preferably about 5 to 16, and more preferably about 6 to 12. For example, the number of radial walls which forms an inside division wall group may be 0 to 10 (preferably 3 to 8, more preferably 4 to 6) in the innermost annular wall (tubular flow path). In a form in which a plurality of annular walls is adjacent, the number of radial walls may be 4 to 14 (preferably 5 to 12, more preferably 6 to 10) in annular walls (annular flow paths) adjacent to each other. The number of extending partition walls forming a peripheral division wall group may be 5 to 18 (preferably 6 to 14, more preferably 8 to 12). In one or more annular walls, it is preferred that the number of radial walls be sequentially increased outwardly in the radial directions of an inner wall of a casing from the center (the axial center portion). The radial walls may be formed radially with intervals at an angle of about 15 to 1800 (for example, about 18 to 120°), preferably about 20 to 90° (for example, about 30 to 60°) in the circumferential direction.

The number of radial walls in either one of annular walls adjacent to each other in the radial direction and the number of radial walls in the other annular wall may be the same or different; the number of extending partition walls (or outer radial walls) forming the peripheral division wall group may be larger than the number of radial walls forming the inside division wall group; the number of radial walls may be increased in the direction (outwardly in the radial direction) from the innermost annular wall toward the outermost annular wall or the inner wall of casing. From annular walls adjacent in the radial direction, the radial walls extend in the radial direction at different positions in the circumferential direction. In the adjacent annular walls, the pitch (or angle) in the circumferential direction of the radial walls may be different, and is preferably the same. In a preferred embodiment, within a range in which a narrow flow path is not formed without impairing a collision performance, the density of the division unit of the circumferential division walls (in particular, the peripheral division walls) may be sparse as compared with the division unit of the inside division walls. For example, in a division wall structure having one or more annular walls, in order to prevent an excessive increase in a flow path diameter near an inner wall of a casing, the number of radial walls extending outwardly in the radial direction from the central portion or annual wall in the plural annular walls, including radial walls extending from the center to divide the innermost annular wall, may be sequentially increased outwardly in the radial direction from the central portion or innermost annual wall. In one or more annular walls, preferred radial walls include plural inside radial walls (including the innermost radial walls) and plural outer radial walls; the inside radial walls are adjacent to each other at the same angle pitch (or interval) in the circumferential direction and extend from an annular wall toward the central portion, and the outer radial walls outwardly extend from the annular wall at the same angle pitch (or interval) in the circumferential direction at circumferentially different positions from the extending sites of the inside radial walls; the number of outer radial walls is larger than that of inside radial walls.

In a preferred rectifying lattice in the embodiment (a), the inside division wall group is formed with rectangular (rectangular such as square and oblong) division walls adjacent in the vertical and horizontal directions, and the circumferential division wall group (in particular, the peripheral division wall group) may be formed with a division wall group which includes at least a first circumferential division wall (a division wall having a configuration in which an open end of U-shaped partition wall is bonded to the curved inner wall of the casing) and which may include a second circumferential division wall (a division wall in a configuration of a divided circular ring such as a semicircular form and a fan-shaped form) formed with a partition wall close to the curved inner wall of the casing. The division wall of the inside division wall group, the division wall of the first circumferential division wall, and/or the division wall of the second circumferential division wall may have a similar (or analogous) or the same shape.

In a preferred non-lattice rectifying element in the embodiments (b) and (c), the inside division wall group includes hexagonal division walls forming a honeycomb structure, or a division wall group as follows: the division wall group at least includes a first inside division wall adjacent in at least the circumferential direction (preferably the circumferential and the radial directions) and may include a second inside division wall formed with at least the innermost annular wall; the first inside division wall is a substantially trapezoidal, annular sector, or another shaped division wall formed with polygonal- or ring-shaped annular walls adjacent in the radial direction and radially extending intermediate radial walls to connect the adjacent annular walls; the second inside division wall is a division wall of the innermost annular wall which is not divided by the innermost radial walls, or a division wall of the innermost annular wall divided to be adjacent in the circumferential direction by the innermost radial walls radially extending from the center, for example, a division wall having a semicircular form, a fan-shaped form, and other forms. The circumferential division wall group (in particular, the peripheral division wall group) is formed with the annular walls, the inner wall of the casing, and the radial walls, and may include a division wall (a substantially trapezoidal, annular sector, or another shaped division wall) adjacent in the circumferential direction. The first inside division wall, the second inside division wall, and/or the division wall of the circumferential division wall group may have a similar (or analogous) or the same shape.

[Extending Partition Wall]

As described above, among the circumferential division walls (or peripheral division walls), a partition wall connected or bonded to the inner wall of the casing forms the extending partition wall. In order to avoid the formation of a narrow division wall (or narrow flow path) in one or adjacent rectifying elements, the division wall structure may have a configuration in which an extending partition wall having a short length to the inner wall of the casing (preferably, at least an extending partition wall having the shortest length) among plural extending partition walls is absent or open. For example, relative to the length of the partition wall of the inside division wall, an extending partition wall having a length of less than 70%, preferably less than 50%, more preferably less than 40%, and particularly less than 30% may be absent. Among the extending partition walls, at least the longest extending partition wall is usually connected or bonded to the inner wall of the casing with no absence.

Among the extending partition walls, relative to an opening area of a division wall unit of an inside division wall group, an extending partition wall forming a circumferential division wall unit (in particular, a peripheral division wall unit or a narrow division wall) having a small opening area [for example, a small opening area of less than 80% (for example, 5 to 70%), preferably less than 60% (for example, 10 to 50%), and more preferably less than 40% (for example, 15 to 30%) relative to the opening area of the division wall unit of the inside division wall group] in association with the inner wall of the casing may be absent or open; an extending partition wall forming a division wall unit having an opening area smaller than the opening area of the division wall unit of the inside division wall group may be absent or open. By absent or opening of such an extending partition wall, no narrow division wall (narrow flow path) is formed; a fluid can smoothly flow even near the inner wall of the casing; a collision force can be improved; an anisotropy of a flow rate distribution can be reduced; and clogging of a rectification element due to impurities can be prevented.

For example, in order to prevent the formation of the narrow flow path in association with the inner wall of the casing, among a plurality of horizontal partition walls and vertical partition walls forming the circumferential division wall group (or peripheral division wall group), at least one end (preferably both ends) of at least one partition wall (in the example shown in the FIG. 4(*a*), the vertical partition walls 14 positioned in both sides among the odd number of vertical partition walls 14) close to or facing the inner wall of the casing may be connected or joined to the other partition wall (in the example shown in the FIG. 4(*a*), the horizontal partition walls 15 positioned in the upper and lower portions among the even number of horizontal partition walls 15) without reaching the inner wall of the casing. That is, at least one end (preferably both ends) of a partition wall forming a non-lattice division wall having a small flow path diameter in relation to the inner wall of the casing may be connected or joined to the other partition wall or division wall without reaching the inner wall of the casing.

The narrow flow path formed of the narrow division wall including the inner wall of the casing means a flow path having a diameter smaller than the flow path diameter of the division wall unit (regular division wall unit having the same or a similar shape) of the inside division wall group. The flow path diameter of the narrow flow path may be about 1 to 80%, preferably about 5 to 70%, and particularly about 10 to 50% with respect to the flow path diameter of the division wall unit (regular division wall unit) of the inside division wall group. The flow path diameter of the narrow flow path may be less than 2 mm (for example, about 0.1 to 1.5 mm), particularly about 0.2 to 1 mm.

[Pitch of Partition Wall or Division Wall, or Others]

In one rectifying element, the thickness of the partition wall (for example, the horizontal partition wall, the vertical partition wall, the annular wall, and the radial wall) may be the same or different in the axial direction, or the partition wall may be curved or linearly reduced in thickness. For example, when the thickness of one end of the partition wall is taken as 100, the thickness of the other end may be about 40 to 90, preferably about 50 to 80, and preferably about 55 to 75 (particularly about 60 to 70). The thickness (or average thickness) of the partition wall may be about 0.1 to 1 mm, or may be about 0.15 to 0.8 mm, preferably about 0.2 to 0.7 mm, more preferably about 0.25 to 0.6 mm, and particularly about 0.3 to 0.6 mm (for example, about 0.3 to 0.5 mm). An excessively small thickness of the partition wall reduces a durability. An excessively large thickness of the partition wall reduces an opening area to easily lower an impact force of a fluid. In a form in which the rectifying elements are adjacently disposed, partition walls having different thicknesses in the axial direction may be opposed to each other in a state in which end faces having a small thickness face each other, in a state in which an end face having a small thickness faces an end face having a large thickness, or preferably in a state in which end faces having a large thickness face each other.

The pitch of the partition wall and the division wall may be about 1.7 to 6 mm or may be about 2 to 5 mm, preferably about 2.3 to 4.5 mm, more preferably about 2.5 to 4 mm, and particularly about 2.6 to 3.8 mm (for example, about 2.6 to 3.6 mm); in a preferred embodiment, the pitch may be about 3 to 3.8 mm (for example, about 3.2 to 3.6 mm). An excessively small pitch of the partition wall and the division wall increases a pressure loss. An excessively large pitch of the partition wall and the division wall easily reduces a rectifying function. The partition wall and the division wall may be formed at different pitches in the vertical and horizontal directions and/or the circumferential direction, or may be formed at the same pitch. It is preferred to form the partition wall and the division wall at the same pitch with respect to the center (axial center) of the casing (or fluid flow passage). In the lattice structure, the relationship of the pitch P in the vertical and horizontal partition walls different in the number of partition walls is as described above. In a case where the horizontal partition walls and the vertical partition walls have the same number of partition walls, the horizontal partition walls and the vertical partition walls may be each formed at the same pitch. At least one partition wall of the horizontal partition walls and the vertical partition walls may be sequentially formed at different pitches, from the viewpoint that even the rectifying elements disposed in a state of being circumferentially displaced from each other prevents the division walls from overlapping and improves the rectifying function.

For example, in a case where the horizontal partition walls and the vertical partition walls have the same number of partition walls, the pitches of both horizontal partition walls and vertical partition walls may be each sequentially reduced (or increased) toward the center; or the horizontal partition walls may be formed at the same pitch, and the vertical partition walls may be formed at sequentially different pitches toward the center. Specifically, for example, the horizontal partition walls may be formed at the same pitch, the vertical partition walls may be formed at sequentially small (or large) pitches toward the center, that is, the densities of the horizontal partition walls and the vertical partition walls may be large (or small) near the central portion of the fluid flow path.

A preferred combination of the thickness of the partition wall and the pitch (or addition average pitch) of the partition wall or division wall includes, for example, a combination of a thickness of 0.2 to 0.7 mm and a pitch of 2 to 4.5 mm (for example, 2.2 to 4.3 mm), preferably a combination of a thickness of 0.2 to 0.6 mm and a pitch of 2.5 to 4 mm, more preferably a combination of a thickness of 0.2 to 0.6 mm and a pitch of 2.6 to 3.8 mm, and particularly a combination of a thickness of 0.3 to 0.6 mm and a pitch of 2.7 to 3.6 mm (for example, 3.2 to 3.6 mm).

Further, the ratio L/P is not particularly limited to a specific one, wherein P represents a pitch (or addition average pitch) of the partition walls (division walls) and L represents a total axial length (full length) of axially adjacent partition walls (or a total axial length of partition walls extending in the axial direction). For example, the ratio L/P preferably satisfies a relationship of 3 to 15, preferably 4 to 15, more preferably 4.5 to 10, and particularly 5 to 8 (for example, 5 to 7). An excessively small ratio L/P easily reduces a rectifying function. An excessively large ratio L/P easily increases a length of a nozzle.

The opening diameter (flow path diameter) or average flow path diameter (addition average flow path diameter) of the division wall structure can be expressed as the diameter of the inscribed circle, and can be selected from a range of, for example, about 1 to 5.5 mm depending on the use of the nozzle, and may usually be about 1.2 to 5 mm, preferably about 1.5 to 4 mm, more preferably about 1.8 to 3.5 mm, and particularly about 2 to 3 mm. In order to prevent clogging of the rectifying element in a nozzle used for industrial water, the minimum flow path diameter of the division wall structure in one rectifying element is preferably about 1.2 to 4 mm (for example, about 1.4 to 3.5 mm), preferably about 1.5 to 3 mm (for example, about 1.6 to 2.8 mm), more preferably about 1.7 to 2.5 mm, and particularly about 1.8 to 2.3 mm as the diameter of the inscribed circle. When viewed from an axial direction of a nozzle in a form in which two rectifying elements are disposed adjacently in the axial direction of a fluid flow path, the minimum flow path diameter (the apparent minimum flow path diameter or the minimum gap diameter between the partition walls) in the overlapping state of the two rectifying elements may be smaller than the minimum flow path diameter of one rectifying element, and may be, for example, about 0.5 to 2.1 mm, preferably about 0.6 to 1.6 mm, more preferably about 0.7 to 1.5 mm, and particularly about 0.8 to 1.4 mm. Such an opening diameter and minimum flow path diameter may be a value of a circumferential division wall group and/or an inside division wall group of a rectifying lattice and a rectifying element of a non-lattice structure, and particularly, may be a value in a rectifying lattice. The minimum flow path diameter may be a minimum flow path diameter in a peripheral division wall group, particularly, in a peripheral division wall group of a rectifying lattice.

The average flow path diameter of the rectifying element can improve a rectifying function without excessively increasing a pressure loss, and more preferably, can be selected in a range capable of preventing clogging with foreign matters. For example, the minimum flow path diameter of the flow path diameters formed of the division walls of the circumferential division wall group may be 50% or more (for example, 55 to 400%), preferably 60% or more (for example, 65 to 3000), more preferably 70% or more (for example, 70 to 250%), particularly 75% or more (for example, 75 to 200%), further 80% or more (for example, 80 to 175%) relative to the minimum flow path diameter of the flow path diameters formed of the division walls of the inside division wall group; in a preferred embodiment, may be about 50 to 150%. (for example, about 55 to 125%), preferably about 60 to 100% (for example, about 65 to 80%). In a case where the division walls of the inside division wall group are formed by vertical and horizontal partition walls of equal pitches, the flow path diameter in the division walls of the inside division wall group and the minimum flow path diameter are substantially the same.

In a peripheral division wall group, an opening area (or addition average opening area) of a non-lattice division wall unit formed of adjacent extending partition walls and an inner wall of a casing may be 70, or more (for example, 75 to 200%), preferably 80% or more (for example, 80 to 180%), more preferably 90% or more (for example, 90 to 150%) with respect to the opening area (or addition average opening area) of the division wall unit of the inside division wall group, and particularly, may be substantially the same as or larger than the opening area of the division wall unit of the inside division wall group.

The ratio (opening area ratio R) of the opening area of a rectifying element having a division wall structure relative to the opening area of the casing itself (casing having no the division wall structure) can be selected from a range of, for example, about 55 to 95% and may be about 60 to 92% (for example, about 63 to 91%), preferably about 65 to 90% (for example, about 67 to 89%), more preferably about 70 to 90% (for example, about 73 to 89%), and particularly about 75 to 88, (for example, about 77 to 88%).

The plural rectifying elements may form an integrated rectifying member. The casing of the rectifying member and rectifying element may be formed of a pipe body of a nozzle body to form a rectifying pipe body having a built-in division wall structure. A filter element having an entering flow path may be attached by screwing or other means upstream of the rectifying pipe body, and a pipe body having an intermediate flow path may be attached by screwing or other means downstream of the rectifying pipe. The rectifying member and the rectifying element may be formed of plastic, ceramics, or the like, and may usually be formed of a metal (a corrosion-resistant metal). The rectifying member and the rectifying element can be produced by metal injection molding, a method of drawing small-diameter inner pipe(s) inserted in a pipe, and other methods.

[Positional Relationship of Rectifying Element, or Others]

In order to divide or subdivide the fluid flow path into plural (two or more) flow path units, a rectifying element (or division wall unit) can be disposed or installed in each of plural sites (in particular, two sites) adjacent in the axial direction of the fluid flow path (rectifying flow path); and the plural rectifying elements which can be disposed or installed adjacently to each other configure or form a rectifying member. The rectifying element may include a hollow tubular casing (in particular, a cylindrical casing) and a division wall structure (partition wall structure) in the casing; the hollow tubular casing is capable of being installed or disposed in the fluid flow path (rectifying flow path) of the nozzle body, and the division wall structure is formed of partition walls (division walls or blades) with a wall surface extending in the axial direction.

The rectifying member includes plural rectifying elements, and may include 2 to 5, preferably 2 to 4, more preferably 2 or 3, and particularly 2 rectifying elements (a first rectifying element and a second rectifying element) depending on the configuration and application of the nozzle. It is sufficient that the rectifying member (plural rectifying elements) can be disposed or installed adjacently in the fluid flow path (rectifying flow path). The inner diameter of the rectifying flow path can be selected according to the application of the nozzle, and may be, for example, about 10 to 50 mm, preferably about 12 to 30 mm, and more preferably about 15 to 20 mm. The rectifying elements may be disposed or installed adjacently (or in contact) with predetermined intervals (or spaces) or without predetermined intervals (or spaces). For example, the interval or distance L2 between adjacent rectifying elements may be about 0 to 20 mm, or may be about 1 to 15 mm, preferably about 2 to 10 mm, and more preferably about 3 to 7 mm. It is preferred that the rectifying elements be disposed adjacently with predetermined intervals (or spaces) in order to improve the rectifying function accompanying the subdivision of the fluid by the division walls or partition walls.

In the flow path of the nozzle body, the rectifying elements may be disposed or installed so that the division walls (or partition walls) corresponding to these elements are contact with or close to each other, or may be disposed or installed at predetermined intervals (or spaces). The interval between the adjacent rectifying elements may be about 10 to 90%, preferably about 20 to 80%, and more preferably 30 to 70% of the inner diameter D of the fluid flow path. An excessively small interval may lower the rectifying function. An excessively large interval may enlarge the length of the nozzle.

As described above, the rectifying elements each provided with a division wall structure, wherein the division wall structures (partition wall structures) are similar or different from each other, may be disposed or installed adjacently in the fluid flow path. For example, the following may be installed: plural rectifying elements each having a similar or different lattice structure; plural rectifying elements each having a similar or different non-lattice structure; a combination of a rectifying element having a lattice structure and a rectifying element having a non-lattice structure. In order to stabilize jetting characteristics and to improve the productivity of the rectifying elements, it is preferred to adjacently dispose or install the rectifying elements each having a similar (or analogous) or the same division wall structure (partition wall structure) (in particular, the same structure such as the same lattice structure and the same non-lattice structure).

The adjacent rectifying elements may be installed or disposed in the fluid flow path of the nozzle body without displacement from each other in the circumferential direction. In the rectifying elements having the same or a similar division wall structure, in order to avoid overlapping of the division walls of the adjacent rectifying elements as viewed from the axial direction of the nozzle body, it is preferred that the rectifying elements can be installed or disposed in the fluid flow path with displacement from each other in the circumferential direction.

The adjacent rectifying elements do not necessarily need to installed or disposed in the nozzle body by positioning in the circumferential direction each other. The adjacent rectifying elements (in particular, rectifying elements having a similar or the same structure) may be provided with positioning portions which can be positioned in the circumferential direction to each other in order to install or dispose the division wall structure in a predetermined direction in the nozzle body. For example, in the opposed division wall structures, a partition wall forming one division wall structure may have a cutout (cutout portion) or notch (cut or slit), and a partition wall forming the other division wall structure may have a projection (or projection wall) adaptable to or installable in the cutout (cut or slit). The positioning portion for positioning the axially adjacent rectifying elements in the circumferential direction may be formed on a casing. The positioning portion of the casing is not limited to an engaging projection 12*a* and an engaging cutout 12*b* formed by notching or cutting an opening end portion of the casing; the positioning portion may include various positioning means using recessed and projected portions, for example, a combination of a cutout groove (keyway) extending in the axial direction at an opening edge (inner wall and/or outer wall) of the casing and a projection (key) capable of slidingly contacting with and engaging the groove.

When the X-axis or Y-axis of adjacent rectifying elements is defined as a reference axis, the displacement angle (phase angle in the circumferential direction) of the reference axis of one rectifying element (or casing) with respect to the reference axis of the other rectifying element (or casing) can be selected from a range of, for example, about 0 to 1800 (for example, 15 to 180°) according to the division wall structure, and may be about 0 to 90° (for example, about 15 to 90°), preferably about 30 to 90° (for example, about 45 to 90°), and more preferably about 60 to 90°. In order to subdivide a fluid, the rectifying elements (rectifying lattices) having a lattice division wall structure may be adjacently disposed at a displacement angle from each other in the circumferential direction of 15 to 90° (for example, 30 to 90°), preferably 45 to 90° (for example, 60 to 90°), and more preferably 80 to 900 (particularly 900). The rectifying elements (or casings) having a non-lattice division wall structure may be adjacently disposed at a displacement angle from each other in the circumferential direction of, for example, 5 to 180° (for example, 5 to 90°), preferably 15 to 120° (for example, 15 to 90°), more preferably 30 to 90°, and particularly 45 to 90° according to the configuration of the division wall structure, the number of radial walls, and other factors.

When the number of rectifying elements is X, adjacent rectifying elements may be capable of being disposed in a fluid flow path of a nozzle body with displacement (or shift) at a phase angle in the circumferential direction of θ(°)=180/X.

The circumferential division wall group and the inside division wall group are required to have the configuration (1) and/or (2). Specifically, (1) as viewed from the axial direction of the nozzle body, a plurality of rectifying elements is disposed in a configuration in which an intersection of division wall units of one rectifying element (for example, a downstream rectifying element) of axially adjacent rectifying elements (division wall units) is positioned within a flow path unit formed of division walls of the other rectifying element (for example, an upstream rectifying element), and such a configuration enables division or split of a fluid by the division walls (or partition walls) of the upstream rectifying element and further division or split of the divided or split fluid by the division walls (or partition walls) of the downstream rectifying element. Thus, as viewed from the axial direction of the nozzle body, an intersection of division wall units of one rectifying element of the adjacent rectifying elements is preferably in a position close to a central portion of a flow path unit formed of division wall units of the other rectifying element in comparison with a position close to a division wall (partition wall) of the other rectifying element. In particular, in a case where a plurality of rectifying elements is disposed in a configuration in which an intersection of division walls of one rectifying element is positioned in a central portion (or center) of a flow path unit formed of division walls of the other rectifying element, the fluid can effectively be subdivided from upstream to downstream to improve a rectifying function.

In the rectifying element having a non-lattice structure, as viewed from the axial direction of the nozzle body, an intersection of division walls or a division wall of one rectifying element of the adjacent rectifying elements may be positioned within a flow path unit (in particular, a central portion or a central portion in the circumferential direction) formed of division walls of the other rectifying element.

It is preferred that the division wall structure of the rectifying element form no narrow flow path, and (2) it is preferred that the inside division wall group be formed with regularly arranged or disposed division wall units, and the circumferential division wall be formed without forming a narrow flow path in relation to the inner wall of the casing. In particular, it is preferred that the rectifying element satisfy the following both characteristics: (1) the configuration in which an intersection of division wall units of one rectifying element in the adjacent rectifying elements is positioned within a flow path unit of a division wall unit of the other rectifying element, and (2) the configuration in which the circumferential division wall has no narrow flow path.

[Nozzle]

The nozzle according to the present invention includes the rectifying member disposed or installed in a fluid flow path. Examples of the type of the nozzle may include, but should not be limited to, a single-fluid nozzle for a liquid such as water, a two-fluid nozzle for a mixed fluid of air and a liquid such as water, and an air nozzle. A preferred nozzle may include a nozzle in which a high rectifying function is desired, particularly, a nozzle in which a high-density jetting of the fluid is desired; for example, a high-pressure nozzle (including a descaling nozzle and other nozzles) capable of removing a deposit, a coating layer, or other adhering materials from a base material or a base, and a cleaning nozzle (such as a high-pressure cleaning nozzle). Examples of the jetting (or jet) pattern may include, but should not be limited to, a straight shape and a conical shape, and preferably a flat-shaped jetting pattern in order to increase a cleaning and removal efficiency. A preferred nozzle may include a high-pressure nozzle, particularly, a descaling nozzle for removing a scale on a surface of a steel plate.

The structure of the nozzle body of such a nozzle is known, and a known structure can be adopted for the nozzle body. The nozzle body can be formed with one or more tubes (or pipes), and is usually provided with: an entering flow path capable of entering or introducing a fluid into the nozzle body; a rectifying flow path which is positioned downstream of the entering flow path and is capable of disposing or installing a rectifying member; and a jet flow path which is positioned downstream of the rectifying flow path and is capable of jetting the fluid from an orifice (discharge port). A preferred descaling nozzle body may be provided with: an entering flow path capable of entering a fluid into the nozzle body through a filter; a rectifying flow path which is positioned downstream of the entering flow path and is capable of disposing a rectifying member; an intermediate flow path extending in a downstream direction from the rectifying flow path; and a jet flow path (jet chamber) which has an inner diameter narrowed in a tapered shape (tapered) from the intermediate flow path and is capable of jetting the fluid from an orifice (discharge port) having a long and narrow shape or oval shape (for example, an elongated oval shape).

A rectifying member (a plurality of rectifying elements) is disposed or installed in the rectifying flow path. As described above, each rectifying element has a division wall structure formed with partition walls extending in the vertical and horizontal directions, the circumferential direction, and/or the radial directions. Since the rectifying element according to the present invention provides a small anisotropy of the flow rate distribution by the direction of the partition wall with respect to the long axis of the orifice, the rectifying element positioned at the most downstream among the rectifying elements [rectifying elements having a division wall structure (such as a lattice structure and a non-lattice structure) of a symmetrical configuration or the same configuration] can be disposed in various directions depending on the form of the orifice. With respect to the long axis direction of the orifice having a long and narrow shape or oval shape, the rectifying element positioned at the most downstream can be disposed or installed in the rectifying flow path with the partition wall angled in a range of 0 to 90°, for example, at 0°, 15°, 30°, 45°, 60°, or 90°. For the orifice (discharge port) having an anisotropic shape, the rectifying elements (in particular, rectifying lattices) may cause an anisotropy of the flow rate distribution of the fluid anisotropic to make the flow rate distribution ununiform, depending on the circumferential orientation of the rectifying element positioned at the most downstream. Thus, the rectifying element (particularly, the rectifying lattice) positioned at the most downstream may be disposed or installed with the partition wall oriented at an angle of about 0±10° or about 90±10° with respect to the long axis direction of the anisotropic-shaped orifice. As described above, use of the rectifying element (for example, a rectifying lattice) having no narrow flow path can reduce the anisotropy of the flow rate distribution of the fluid, and allows the uniformization of the flow rate distribution even if the partition wall of the rectifying lattice is oriented or directed at an angle of, for example, 45° or 90° with respect to the long axis direction of the orifice having a long and narrow shape or oval shape (for example, an elongated oval shape).

The intermediate flow path may have a flow path extending in the downstream direction with the same inner diameter, or as described above, may have at least one flow path having an inner diameter narrowed in a tapered shape (tapered) toward the downstream direction. For example, the intermediate flow path may have a first intermediate flow path (tapered flow path) having a flow path diameter narrowed in a tapered shape (tapered) toward the downstream direction; or may include the first intermediate flow path (tapered flow path) having the flow path diameter narrowed in a tapered shape toward the downstream direction, a second intermediate flow path extending with the same inner diameter from the first intermediate flow path, and a third intermediate flow path (tapered flow path) having a flow path diameter narrowed in a tapered shape (tapered) toward the downstream direction from the second intermediate flow path. The tapered flow path diameter may be narrowed in a straight shape or a curved shape with respect to the axis line.

The taper angle of the intermediate flow path may be, for example, about 3 to 20° (for example, about 4 to 17°), preferably about 5 to 15° (for example, about 6 to 12°), and more preferably about 6 to 10° (for example, about 6 to 9°).

When D3 represents an inner diameter of the upstream end of the intermediate flow path (the downstream end of the rectifying flow path) and L3 represents a length of the intermediate flow path extending in the downstream direction from the rectifying flow path to reach a jet flow path, L3/D3 may be, for example, about 3.5 to 7.5, preferably about 4 to 7, and more preferably about 4.5 to 6.5.

The nozzle tip has a jet flow path which is tapered and is opened at an orifice (discharge port), and is usually provided with a flow path extending in the downstream direction with the same inner diameter from the intermediate flow path and a jet flow path which is tapered from the flow path and is opened at an orifice (discharge port). The taper angle θ2 of the jet flow path may be, for example, about 25 to 75° (for example, about 30 to 70°), preferably about 35 to 65° (for example, about 40 to 60°), and more preferably about 45 to 55°. The jet flow path may be formed with an inclined wall having a single taper angle or may be formed with inclined walls having multiple (for example, two) taper angles. For example, inclined walls having two taper angles including the taper angle θ2 of the flow path may include an inclined wall (inclined flow path) having a taper angle about 1 to 20° (for example, about 2 to 10°) smaller or larger than the taper angle θ2, particularly an inclined wall having a taper angle smaller than the taper angle θ2, upstream of the flow path having the taper angle θ2.

According to the use of the nozzle and the jet form or jetting pattern of the fluid, the orifice (discharge port) may be opened in a circular shape or a polygonal shape; the orifice may be opened in a long and narrow shape (or a slit shape) or an oval shape (for example, a long and narrow oval shape). Use of the orifice having such a shape allows jetting of the fluid in a fan-shaped flat pattern and formation of a jetting pattern suitable for a descaling nozzle.

The orifice may be opened at a flat tip surface of a nozzle tip. In a preferred embodiment, the tip surface of the nozzle tip has a radially extending curved groove having a U-shaped cross section, and the jet flow path is opened at a center or central portion of the curved recessed surface of the curved groove. The curved recessed surface may have a configuration in which both side portions are raised in the front direction toward the radial direction from a central portion (the lowermost portion or the deepest portion) where the orifice (discharge port) is opened.

The nozzle tip can be formed of various materials according to the application. For example, a nozzle tip of a descaling nozzle can be formed of a cemented carbide.

With respect to the filter positioned upstream of the rectifying member, a filter element having a cylindrical cross section and having an inflow hole for introducing the fluid may practically be used. The inflow hole can be formed in at least a circumferential or peripheral wall of the filter element, preferably a circumferential or peripheral wall and an end wall (an upstream end wall) of the filter element. The shape of the inflow hole may include, but should not be limited to, an independent hole shape such as a circular, an oval, or a polygonal shape (e.g., a triangular or a quadrilateral shape), a long and narrow shape (a slit shape), or other shapes. The slit-shaped inflow hole may extend in the axial direction with intervals in the circumferential direction.

A preferred filter element has a plurality of inflow holes and/or slit-shaped inflow holes formed in at least a circumferential wall thereof. A further preferred filter element is in a perforated form having a plurality of inflow holes scattered in a circumferential or peripheral wall and an end wall (an upstream end wall) thereof. For the slit-shaped inflow hole, flat foreign matters may enter the entering flow path to cause clogging of the division wall structure of the rectifying element. Thus, a preferred inflow hole has the above-mentioned independent hole shape, particularly, a circular shape.

The hole diameter of the inflow hole (a diameter of an inscribed circle of the inflow hole or a long axis length of the inflow hole) may be larger than the minimum flow path diameter of the division wall structure of the rectifying element. In order to prevent clogging of the rectifying element and decreased rectification, the hole diameter of the inflow hole is preferably substantially the same as the minimum flow path diameter of the division wall structure of the rectifying element, particularly, smaller than the minimum flow path diameter of the division wall structure.

The hole diameter of the inflow hole can be selected from a range of, for example, about 0.5 to 5 mm (for example, about 1 to 3 mm) according to the configuration of the inflow hole, the species of the jet fluid, or others, and may be about 1 to 2.5 mm, preferably about 1.2 to 2.2 mm, and more preferably about 1.5 to 2 mm. The hole diameter of the inflow hole can be interchangeably replaced with an average hole diameter or a minimum hole diameter.

The offset flow path length L1 between the downstream end of the inflow hole of the filter element and the upstream end of the rectifying member may be about 0 to 20 mm, about 5 to 15 mm, and preferably about 7.5 to 12.5 mm.

The filter (and the filter element) may be formed of a plastic, a ceramics, or other materials, and can usually be formed of a metal (for example, a corrosion-resistant metal). The filter (and the filter element) can be produced by using injection molding, cutting, pore electrical discharge machining, or other means.

As the fluid, there may be used a gas (e.g., air, an inert gas), a liquid, or a mixed fluid of a gas and a liquid, depending on the application, preferably water and/or air, and particularly water.

The pressure of the fluid can be selected from a range of about 0.1 to 100 MPa according to the application of the nozzle. For a high-pressure nozzle, particularly a descaling nozzle, the pressure of the fluid (in particular, water pressure) may be selected from a range of about 10 to 25 MPa, about 10 to 40 MPa, about 10 to 60 MPa, or about 15 to 55 MPa (for example, about 20 to 50 MPa) depending on, for example, the degree of scale formation in a rolling step of a steel mill.

In the present invention, the rectifying element and the nozzle may be configured by combining respective elements and configurations of various embodiments, including preferred embodiments described in the specification of this application. For example, the rectifying member may include two rectifying elements which can be disposed or installed with a predetermined interval or space in the axial direction of the cylindrical rectifying flow path, and the division wall structure of such a rectifying element may include a peripheral division wall group and an inside division wall group; the peripheral division wall group may include division walls contacting or connecting with an inner wall of a cylindrical casing and being adjacent in the circumferential direction, and the inside division wall group may include partition walls being adjacent to the inside of the peripheral division wall group and extending in vertically, horizontally, circumferentially, and/or radially. Preferred configurations or forms of such rectifying member and nozzle are as follows.

(A) Lattice Structure

A division wall structure having a lattice structure in which horizontal partition walls extend in the X-axis direction with the same pitch (or at regular intervals) and vertical partition walls extend in the Y-axis direction with the same pitch (or at regular intervals), and the horizontal partition walls and the vertical partition walls are symmetrical (line-symmetric) with respect to the X-axis or the Y-axis, respectively, as the central axis. The division wall structure has a relationship in which either one of the horizontal partition walls and the vertical partition walls has n partition walls and the other has n+1 partition walls (where n denotes an integer of 3 to 5), and the division wall structure has a peripheral division wall group with no narrow division wall and has the following configurations:

(A-1) as shown in FIG. 4, the partition walls with an even number of partition walls are connected (or bonded) to the inner wall of the casing without traversing the central portion of the fluid flow path (or casing);

of the partition walls with an odd number of partition walls, the central partition wall traverses or crosses the central portion of the fluid flow path (or casing), a partition wall (one or more partition walls) positioned in the central region (or inside region), including the central partition wall, is connected (or bonded) to the inner wall of the casing, and a partition wall positioned in a side region (both side regions) (at least a partition wall close to or facing the inner wall of the casing) has both ends connected or bonded to partition walls having an even number of partition walls without reaching or joining to the inner wall of the casing.

(A-2) In contrast to the above-mentioned embodiment, as shown in FIGS. 5(*a*) (b), the central partition wall of the partition walls with an odd number of partition walls traverses or crosses the central portion of the fluid flow path (or casing) and is connected (or bonded) to the inner wall of the casing;

the partition walls with an even number of partition walls are connected (or bonded) to the inner wall of the casing without traversing the central portion of the fluid flow path (or casing); of the partition walls with an even number of partition walls, a partition wall (one or more partition walls) positioned in the central region (or inside region) is connected (joined or bonded) to the inner wall of the casing, and a partition wall positioned in a side region (both side regions) (at least a partition wall close to or facing the inner wall the of the casing) has both ends connected or bonded to the partition walls having an odd number of partition walls without reaching or joining to the inner wall of the casing.

(A-3) Further, as shown in FIG. 5(*c*), the partition walls with an even number of partition walls are connected (or bonded) to the inner wall of the casing without traversing the central portion of the fluid flow path (or casing); of the partition walls with an even number of partition walls, a partition wall (one or more partition walls) positioned in the central region (or inside region) is connected (or bonded) to the inner wall of the casing;

the central partition wall of the partition walls with an odd number of partition walls traverses or crosses the central portion of the fluid flow path (or casing), a partition wall (one or more partition walls) positioned in the central region (or inside region), including the central partition wall, is connected (or bonded) to the inner wall of the casing;

of the partition walls with an even number of partition walls, a partition wall positioned in a side region (both side regions) (at least a partition wall close to or facing the inner wall of the casing) has both ends connected or bonded to the partition walls having an odd number of partition walls without reaching or joining to the inner wall of the casing;

of the partition walls with an odd number of partition walls, a partition wall positioned in a side region (both side regions) (at least a partition wall close to or facing the inner wall of the casing) has both ends connected or bonded to the partition walls having an even number of partition walls without reaching the inner wall of the casing.

These configurations (A-1) to (A-3) may have at least one characteristic selected from the following (i) and (ii).

(i) Among a plurality of extending partition walls, at least the shortest extending partition wall (or an extending partition wall having the smallest length) is absent, and at least the longest extending partition wall (or an extending partition wall having the largest length) is connected or bonded to the inner wall of the casing without absence.

(ii) The partition walls having a larger number of partition walls are formed with a pitch P substantially equally dividing the inner diameter (fluid flow path) D of the casing [P=D/(n+2)]; the partition walls having a smaller number of partition walls are formed with a pitch substantially the same as the pitch P with the axial center of the casing (fluid flow path) as a center.

(A-4) The partition walls with an even number of partition walls are connected (or bonded) to the inner wall of the casing without traversing the central portion of the fluid flow path (or casing);

the central partition wall of the partition walls with an odd number of partition walls traverses or crosses the central portion of the fluid flow path (or casing) and is connected (or bonded) to the inner wall of the casing;

(iii) assuming that the horizontal partition walls and the vertical partition walls equally dividing the inner diameter (fluid flow path) D of the casing are formed with reference to the axial center (center) of the casing, both side portions (or side regions) in the horizontal partition walls and/or the vertical partition walls are absent (or there are no both side portions in the horizontal partition walls and/or the vertical partition walls); and/or (iv) the horizontal partition walls and the vertical partition walls have a smaller pitch near the central portion of the casing (or fluid flow path) (or have a pitch which is sequentially smaller toward the central portion).

(B) Non-Lattice Division Wall Structure (b-1) A division wall structure in which the inside division wall group includes a honeycomb-shaped division wall (a regular-hexagonal division wall unit), and the peripheral division wall group includes extending partition walls extending in the radial directions with the same interval (pitch) from circumferentially different positions of the inside division wall group and being connected or joined to the inner wall of the casing; the division wall structure has a symmetrical shape (line-symmetric shape) with respect to the X-axis or the Y-axis as the central axis; and in the peripheral division wall group, a non-lattice division wall unit formed with the extending partition walls adjacent to each other and the inner wall of the casing has an opening area substantially the same as or larger than the opening area of the division wall unit of the inside division wall group.

(b-2) A division wall structure including 2 to 4 (in particular, 2 or 3) concentric annular walls, and intermediate radial walls extending in the radial direction to connect these adjacent annular walls, wherein each one of the annular walls is formed of a hexagonal- to dodecagonal ring or circular ring; the inside division wall group comprises radially extending intermediate radial walls at different positions in the circumferential direction to connect the annular walls (or inner or inside annular walls) adjacent to each other in at least the radial direction; the peripheral division wall group comprises extending partition walls (outer radial walls) from the outermost annular wall to reach the inner wall of the casing at different positions in the circumferential direction from the radial walls extending from an annular wall adjacent to the outermost annular wall.

The division wall structure (b-2) may include a plurality of innermost radial walls radially spreading (or extending) from the central portion of the innermost annular wall (in particular, at equal intervals or at equal angles in the circumferential direction) to reach circumferentially different positions from the extending positions of the intermediate radial walls in the innermost annular wall.

Also in the division wall structure (b-2), the opening area of the division wall unit of the peripheral division wall group may be 80% or more and preferably 90% or more with respect to that of the inside division wall group, particularly, may be substantially the same as or larger than that of the inside division wall group.

In the division wall structure (b-2), the number of radial walls forming the inside division wall group is 0 to 8 (preferably 2 to 6) in a tubular flow path formed with the innermost annular wall, and is 4 to 14 (preferably 5 to 12, more preferably 6 to 10) in one annular flow path formed between annular walls adjacent to each other, the number of extending partition walls forming the peripheral division wall group is 5 to 18 (preferably 6 to 14, more preferably 8 to 12), and the number of the extending partition walls may be larger than the number of the radial walls forming the inside division wall group.

In the embodiments (b-1) and (b-2), particularly, the embodiment (b-2), each radius of the annular walls in one rectifying element may be the same as or different from that of the annular walls in the other rectifying element, and the radial walls (inside, intermediate, outer radial walls) in one rectifying element may be provided at the same or different positions in the circumferential direction from the radial walls in the other rectifying element so that an intersection of division walls or a division wall (a radial wall) of one rectifying element can be positioned within a flow path unit (particularly, the central portion or the central portion in the circumferential direction) formed with the division walls of the other rectifying element.

The division wall structures (A) and (B) may further have at least one characteristic selected from the following (v) and (vi).

(v) The opening area ratio R of the rectifying element is 70 to 90% and preferably 75 to 881.

(vi) In one rectifying element, the minimum flow path diameter is 1.6 to 2.8 mm, preferably 1.7 to 2.5 mm, and more preferably 1.8 to 2.3 mm, as the diameter of the inscribed circle.

(C) Rectifying Element

Rectifying elements capable of being disposed or installed adjacently to each other in two adjacent sites in a fluid flow path extending in the axial direction of the nozzle body, each rectifying element including a cylindrical casing and a division wall structure of the above-mentioned (A) or (B) formed in the casing. The rectifying elements may be capable of being disposed or installed in the two adjacent sites in the fluid flow path in a state in which the rectifying elements are displaced from each other in the circumferential direction.

(D) Nozzle

A descaling nozzle which includes: a nozzle body having a rectifying flow path, and two rectifying elements disposed or installed with a predetermined interval in the rectifying flow path of the nozzle body; each rectifying element is a rectifying element of the above-mentioned (A) or (B); in the above-mentioned rectifying element (rectifying lattice) having a lattice structure (A), the adjacent rectifying lattices may be disposed or installed in a state in which the partition walls (vertical and horizontal partition walls) of one rectifying lattice is displaced or traversed with respect to those of the other rectifying lattice at an angle of 80° to 90° (in particular, 90°) in the circumferential direction; in the above-mentioned rectifying element having a non-lattice structure (B), the adjacent rectifying elements may be disposed or installed in a state in which the rectifying elements are displaced from each other at an angle of 5 to 180° (in particular, 30 to 90°) in the circumferential direction.

The descaling nozzle may be provided with a perforated filter element upstream of the nozzle body, and the filter element may have at least a circumferential wall having inflow holes with a hole diameter substantially the same as or smaller than the minimum flow path diameter of the rectifying element.

(E) Further, the present invention also encompasses use of a rectifying member capable of being disposed or installed in the fluid flow path extending in the axial direction of the nozzle body (or use of a rectifying member for rectifying a fluid). In this use, the rectifying member includes rectifying elements capable of being disposed or installed adjacently to each other in the axial direction of the fluid flow path.

EXAMPLES

The following examples are intended to describe this invention in further detail and should by no means be interpreted as defining the scope of the invention.

[Structure of Nozzle]

A descaling nozzle having a structure shown in FIG. 2 was used in the Examples, Reference Examples and Comparative Examples (however, Comparative Example 2 is excluded). The nozzle has a flow path including: a cylindrical entering flow path (inner diameter: 17 mm, axial length (or length in an axial direction): 25 mm) of a filter unit 3 which has a plurality of holes 4 formed at a circumferential wall and an upstream end wall; a cylindrical offset flow path (inner diameter: 17 mm, length L1=10 mm) which is formed between the most downstream hole 4 among the holes 4 and a downstream end of the filter unit 3; a cylindrical rectifying flow path 6 (inner diameter: 17 mm, axial length: 25 mm), extending from the offset flow path in a downstream direction, for installation of a rectifying member; a cylindrical first intermediate flow path 21 (an angle θ1 of an inner wall with respect to the axis=3.75° (taper angle: 7.5°), axial length: 45.8 mm) extending from the rectifying flow path in the downstream direction and having a flow path diameter narrowed in a tapered shape; a cylindrical second intermediate flow path 22 (inner diameter: 11 mm, axial length: 45.7 mm) extending from the downstream end of the first intermediate flow path with the same inner diameter; a cylindrical flow path 24 (inner diameter: 11 mm, axial length: 13 mm) of a nozzle tip 27; and a jet flow path 26 (taper angle θ2=50°), wherein the jet flow path 26 is open with an orifice (a discharge port) 28 (an oval shape having a major axis of 3.78 mm, a minor axis of 2.31 mm, and the major axis/the minor axis of 1.6) of the nozzle tip 27. A casing (thickness: 1.5 mm) of the rectifying member is installed in (attached to) a cylindrical installation section (inner diameter: 18.5 mm) corresponding to the rectifying flow path 6 to form an inner wall (inner diameter: 17 mm) of the rectifying flow path 6 by an inner wall of the casing of the rectifying member.

Each of rectifying members described in Examples, Reference Examples and Comparative Examples was installed in (attached to) the rectifying flow path 6; an industrial water as a fluid was jetted in a jetting (or spraying) pattern spreading in a fan shape under the following jetting conditions, and the following thickness collision force test was conducted to measure a collision force.

[Jetting Conditions]

Spray jet pressure (water pressure): 15 MPa

Discharge flow rate (amount of water): 111 L/min

Jet angle (spread angle of a fan-shaped jetting pattern from a discharge port): about 36.5°

Jet distance from discharge port: H=200 mm (if necessary, H=300 mm)

Width of jetting pattern at measurement distance: 135 mm (jet distance: H=200 mm), 194 mm (jet distance: H=300 mm)

[Collision Force Test]

A pressure receiving part (1 mmϕ) of a load sensor (manufactured by Showa Sokki Corporation, "DBJ-10") was moved in a thickness direction of a jetting pattern spreading in a fan shape to cross or traverse the jetting pattern, and the pressure distribution was recorded with a thickness of the jetting pattern (a spray thickness) as a horizontal axis and a received pressure per unit area as a vertical axis. The highest pressure in the pressure distribution was recorded as the highest collision force (hereinafter, may simply be referred to as "collision force").

A single or two rectifying elements were disposed in the rectifying flow path 6, and the two rectifying elements were installed at an interval L2 of 5 mm. Except for Example 8, the two rectifying elements were installed with displacement from each other at an angle of 90° in a circumferential direction in the rectifying flow path 6. In Example 8, the two rectifying elements were installed with displacement from each other at an angle of 30° or 90° (Example 8-1), an angle of 180° (Examples 8-2, 8-4, and 8-5), or an angle of 90° (Example 8-3) in the circumferential direction.

Example 1 (Rectifying Element Having a Lattice Structure with a Narrow Flow Path Formed Therein)

Rectifying elements (rectifying lattices) shown in FIGS. 6(*a*) to (*c*) were used. Specifically, in a cylindrical casing (inner diameter: 17 mm), a lattice structure was formed in which vertical partition walls (axial length: 10 mm) and horizontal partition walls (axial length: 10 mm) were perpendicular to each other at the following pitches to prepare the rectifying element (rectifying lattice), wherein a thickness of the vertical and horizontal partition walls was adjusted to 0.2 to 0.7 mm. The rectifying element had a configuration in which an even number of vertical partition walls were arranged with avoiding the central portion of the cylindrical casing, and a central partition wall of an odd number of partition walls was arranged with traversing the central portion of the cylindrical casing. The details and the pitches of the partition walls are as follows.

Example 1-1: Number of horizontal partition walls: n=3, Number of vertical partition walls: n+1=4 (a lattice structure shown in FIG. 6(*a*)) Example 1-2: Number of horizontal partition walls: n+1=5, Number of vertical partition walls: n=4 (a lattice structure shown in FIG. 6(*b*))

Example 1-3: Number of horizontal partition walls: n=5, Number of vertical partition walls: n+1=6 (a lattice structure shown in FIG. 6(*c*))

In the rectifying flow path 6 of the nozzle body, the most downstream rectifying lattice (a first rectifying lattice or a first rectifying element) was installed with directing or orienting the partition wall of the rectifying lattice in the long axis direction of the orifice, and a second rectifying lattice (a second rectifying element) was installed at an interval L2 of 5 mm relative to the first rectifying lattice with circumferentially displacing the partition wall of the second rectifying lattice at an angle of 90° with respect to the partition wall of the first rectifying lattice.

The results are shown in the table below. FIG. 10 shows a relationship between an opening area ratio R and a collusion force at the jet distance H=200 mm. As a reference, the table also shows the data of Comparative Example 3 which showed the highest collision force among the rectifying members of Comparative Examples 1 to 3.

TABLE 1

| | Thickness of partition wall (mm) | Pitch (mm) | Opening area ratio R (%) | Collision force (MPa) H = 200 mm | Collision force (MPa) H = 300 mm |
|---|---|---|---|---|---|
| Example 1-1 | 0.6 | 4.25 | 73.6 | 1.08 | 0.64 |
| | 0.5 | | 77.8 | 1.09 | 0.65 |
| | 0.4 | | 82.0 | 1.10 | 0.64 |
| | 0.3 | | 87.0 | 1.10 | 0.63 |
| Example 1-2 | 0.7 | 3.40 | 64.5 | 1.06 | 0.62 |
| | 0.6 | | 69.1 | 1.08 | 0.63 |
| | 0.5 | | 73.8 | 1.10 | 0.63 |
| | 0.4 | | 78.7 | 1.14 | 0.67 |
| | 0.3 | | 83.7 | 1.17 | 0.68 |
| Example 1-3 | 0.6 | 2.80 | 63.3 | 1.08 | 0.63 |
| | 0.5 | | 68.8 | 1.11 | 0.65 |
| | 0.4 | | 74.5 | 1.15 | 0.67 |
| | 0.3 | | 80.5 | 1.19 | 0.69 |
| | 0.2 | | 86.7 | 1.20 | 0.69 |
| Comparative Example 3 | 0.5 | 3.0 | 70.3 | 1.04 | 0.62 |

As apparent from the above results, the collision force increases with decreasing thickness of the partition wall and with increasing opening area ratio R. In particular, the collision force increases when the opening area ratio R is 70 to 90% (especially 75 to 89%). Furthermore, the collision force tends to be greater with increasing number of lattice division walls (partition walls) and with narrowing pitch. The rectifying elements of Examples having lattice division walls show a higher collision force compared with the rectifying member of Comparative Example 3 having a honeycomb structure when compared in the same opening area ratio R.

Example 2 (Rectifying Lattice Mainly Having No Narrow Flow Path Formed Therein)

A nozzle performance was evaluated in the same manner as in Example 1 except that the following rectifying lattices were used: a rectifying lattice having a lattice structure shown in FIG. 4(*a*) (Example 2-1); a rectifying lattice having a division wall structure shown in FIG. 5(*b*) (Example 2-2); and a rectifying lattice having a division wall structure shown in FIG. 5(*c*) (Example 2-3). The most downstream rectifying lattice (a first rectifying lattice or a first rectifying element) was installed in the rectifying flow path of the nozzle body with displacing or changing an angle of the partition wall of the rectifying lattice (a displacement angle in a circumferential direction) with respect to the long axis of the orifice, and a second rectifying lattice was installed in the rectifying flow path of the nozzle body with a distance L2 of 5 mm from the first rectifying lattice. The second rectifying lattice was installed with circumferentially displacing the partition wall of the second rectifying lattice at an angle of 90° with respect to the partition wall of the first rectifying lattice.

Example 2-1: Thickness of partition wall: 0.5 mm, Total axial length of axially adjacent two partition walls: 20 mm, Number of horizontal partition walls: n=4, Number of vertical partition walls: n+1=5, Pitch: 3.4 mm, Minimum flow path diameter: 2.14 mm (a lattice structure shown in FIG. 4(*a*))

Example 2-2: Thickness of partition wall: 0.5 mm, Total axial length of axially adjacent two partition walls: 20 mm, Number of horizontal partition walls: n+1=5, Number of vertical partition walls: n=4, Pitch: 3.4 mm, Minimum flow path diameter: 2.14 mm (a lattice structure shown in FIG. 5(*b*))

Example 2-3: Thickness of partition wall: 0.5 mm, Total axial length of axially adjacent two partition walls: 20 mm, Number of horizontal partition walls: n=5, Number of vertical partition walls: n+1=6, Pitch: 2.8 mm, Minimum flow path diameter: 1.2 mm (a lattice structure shown in FIG. 5(*c*))

The results are shown in the table below.

TABLE 2

| | Angle to orifice (°) | Opening area ratio R (%) | Collision force (MPa) H = 200 mm | Collision force (MPa) H = 300 mm |
|---|---|---|---|---|
| Example 2-1 | 0 | 73.6% | 1.16 | 0.66 |
| | 45 | | 1.13 | 0.65 |
| | 90 | | 1.14 | 0.65 |
| Example 2-2 | 0 | 73.2% | 1.14 | 0.65 |
| | 45 | | 1.11 | 0.63 |
| | 90 | | 1.14 | 0.64 |
| Example 2-3 | 0 | 70.7% | 1.10 | 0.63 |
| | 45 | | 1.17 | 0.67 |
| | 90 | | — | — |

As apparent from the above results, the rectifying lattice (the rectifying element) of Example 2 shows a high collision force. In particular, the rectifying lattices (the rectifying elements) of Examples 2-1 and 2-2 show a small anisotropy of the collision force to the long axis of the orifice since the collision force is high even though the partition wall has a different angle with respect to the long axis of the orifice.

Example 3 (Positional Relationship Between Orifice and Rectifying Lattice Having Narrow Flow Path Formed Therein)

A nozzle performance was evaluated in the same manner as in Example 1 except that a rectifying element (a rectifying lattice) having a division wall structure shown in FIG. 6(*c*) was used. The division wall structure was formed with a thickness of a partition wall of 0.5 mm, a total axial length of axially adjacent two partition walls of 20 mm, the number of horizontal partition walls of n=5, the number of vertical partition walls of n+1=6, and a pitch of 2.8 mm. The most downstream rectifying lattice (a first rectifying lattice) was installed in the rectifying flow path of the nozzle body with displacing or changing an angle of the partition wall of the rectifying lattice (a displacement angle in a circumferential direction) with respect to the long axis of the orifice, and a second rectifying lattice was installed in the rectifying flow path of the nozzle body with a distance L2 of 5 mm from the first rectifying lattice. The second rectifying lattice was installed with circumferentially displacing the partition wall of the second rectifying lattice at an angle of 90° with respect to the partition wall of the first rectifying lattice. The results are shown in the table below.

TABLE 3

| | Angle to orifice (°) | Collision force (MPa) H = 200 mm | Collision force (MPa) H = 300 mm | Opening area ratio R (%) |
|---|---|---|---|---|
| Example 3 | 0 | 1.16 | 0.66 | 68.8% |
| | 45 | 1.06 | 0.59 | |
| | 90 | 1.12 | 0.65 | |

As apparent from the above results, the rectifying lattice shows a high collision force even if a narrow flow path is formed in a peripheral division wall of a lattice structure in association with an inner wall of a casing. Compared with a rectifying lattice having no narrow flow path, the rectifying lattice with the narrow flow path may slightly change the collision force depending on the angle of the partition wall to the long axis of the orifice, and tends to increase an anisotropy to the long axis of the orifice. Even the rectifying lattice including the narrow flow path can reduce the anisotropy by adjusting the circumferential displacement angle.

Example 4 (Rectifying Lattice Having Partition Walls Shifted to Central Region Thereof)

A performance of a rectifying lattice was evaluated in the same manner as in Example 2 except that rectifying lattices shown in FIGS. 5(*e*) and (*f*) were used, each of which included latticed division walls shifted to a central region or portion of the rectifying lattice.

Example 4-1: Thickness of partition wall: 0.5 mm, Total axial length of axially adjacent two walls: 20 mm, Number of horizontal partition walls: n+1=5, Number of vertical partition walls: n=4, Pitch: 2.6 mm (a lattice structure shown in FIG. 5(*e*))

Example 4-2: Thickness of partition wall: 0.5 mm, Total axial length of axially adjacent two partition walls: 20 mm, Number of horizontal partition walls: n+1=5, Number of vertical partition walls: n=4, Pitch: 2.3 mm (a lattice structure shown in FIG. 5(*e*))

Example 4-3: Thickness of partition wall: 0.5 mm, Total axial length of axially adjacent two partition walls: 20 mm, Number of horizontal partition walls: n+1=4, Number of vertical partition walls: n=3, Pitch: 2.8 mm (a lattice structure shown in FIG. 5(*f*))

The results are shown in the table below.

TABLE 4

| | Angle to orifice (°) | Collision force (MPa) H = 200 mm | Opening area ratio R (%) |
|---|---|---|---|
| Example 4-1 | 0 | 1.16 | 71.4 |
| | 45 | 1.05 | |
| | 90 | 1.13 | |
| Example 4-2 | 0 | 1.17 | 70.7 |
| | 45 | 1.14 | |
| | 90 | 1.14 | |
| Example 4-3 | 0 | 1.18 | 76.6 |
| | 45 | 1.13 | |
| | 90 | 1.13 | |

As apparent from the above results, the rectifying lattices of Example 4 show a high collision force. In particular, the rectifying lattices of Examples 4-2 and 4-3 show a small anisotropy of the collision force to the long axis of the orifice since the collision force is high even though the partition wall has a different angle with respect to the long axis of the orifice.

Example 5 (Rectifying Lattice with Variant Pitch of Partition Walls)

A rectifying lattice having a lattice structure as a division wall structure was prepared; the lattice structure had a thickness of a partition wall of 0.5 mm, a total axial length of axially adjacent two partition walls of 20 mm, the number of vertical partition walls of n=4, and the number of horizontal partition walls of n=4, provided that the vertical partition walls had a sequentially increased pitch toward a central portion as shown in FIG. 11.

A nozzle performance was evaluated in the same manner as in Example 1, and the results shown in the table below were obtained. In the table, in the pitch column, the horizontal pitch (interval) of a plurality of vertical partition walls 84 extending in the vertical direction (Y-axis direction) is represented as "Ph", and the vertical pitch (interval) of a plurality of horizontal partition walls 85 extending in the horizontal direction (X-axis direction) is represented as "Pv". Further, "Ph1" shows a pitch (an interval or a distance) between two central vertical partition walls 84*a* adjacent to each other in a central portion (or a central area) or a central region among the four vertical partition walls 84, and "Ph2" shows a pitch (an interval) between either one of the central vertical partition walls 84*a* and the outermost vertical partition wall 84*b* adjacent to the central vertical partition wall 84*a*. Furthermore, "Pv1" means a pitch (an interval) between two central horizontal partition walls 85*a* adjacent to each other in a central portion or a central region among the four horizontal partition walls 85, and "Pv2" means a pitch (an interval) between either one of the central horizontal partition walls 85*a* and the outermost horizontal partition wall 85*b* adjacent to the central horizontal partition wall 85*a*.

TABLE 5

| | Pitch (mm) | | | | Opening area ratio | Collision force (MPa) | |
|---|---|---|---|---|---|---|---|
| | Pv1 | Pv2 | Ph1 | Ph2 | R (%) | H = 200 mm | H = 300 mm |
| Example 5 | 2.5 | 2.65.1 | 2.58 | 2.58 | 74.6 | 1.06 | 0.56 |

As apparent from Table 5, even the rectifying lattice having the vertical partition walls with a sequentially increased pitch toward the central portion shows a high collision force.

Example 6 (Rectifying Lattice with Variant Pitch of Partition Walls)

A rectifying lattice having a lattice structure as a division wall structure was prepared; the lattice structure had a thickness of a partition wall of 0.5 mm, a total axial length of axially adjacent two partition walls of 20 mm, the number of vertical partition walls of n=4, and the number of horizontal partition walls of n+1=5, provided that the vertical and horizontal partition walls each had a sequentially increased pitch toward a central portion as shown in FIG. 12 and Table 6.

A nozzle performance was evaluated in the same manner as in Example 1, and the results shown in the table below were obtained. In the table, in the pitch column, the horizontal pitch (interval) of a plurality of vertical partition walls 94 extending in the vertical direction (Y-axis direction) is represented as "Ph", and the vertical pitch (interval) of a plurality of horizontal partition walls 95 extending in the horizontal direction (X-axis direction) is represented as "Pv". Further, "Ph1" shows a pitch (an interval or a distance) between two central vertical partition walls 94*a* adjacent to each other in a central portion or a central region among the four vertical partition walls 94, and "Ph2" shows a pitch (an interval) between either one of the central vertical partition walls 94*a* and the outermost vertical partition wall 94*b* adjacent to the central vertical partition wall 94*a*. Furthermore, "Pv1" means a pitch (an interval) between the central horizontal partition wall 95*a* among the five horizontal partition walls 95 and an intermediate horizontal partition wall 95*b* adjacent to the central horizontal partition wall 95*a*, and "Pv2" means a pitch (an interval) between the intermediate horizontal partition wall 95*b* and the outermost horizontal partition wall 95*c* adjacent to the intermediate horizontal partition wall 95*b*.

TABLE 6

| | Pitch (mm) | | | | Opening area ratio | Collision force (MPa) | |
|---|---|---|---|---|---|---|---|
| | Pv1 | Pv2 | Ph1 | Ph2 | R (%) | H = 200 mm | H = 300 mm |
| Example 6-1 | 3 | 2.8 | 2.9 | 2.6 | 72.1 | 1.13 | 0.57 |
| Example 6-2 | 2.8 | 2.6 | 2.7 | 2.4 | 71.5 | 1.14 | 0.59 |
| Example 6-3 | 2.6 | 2.4 | 2.5 | 2.3 | 71.1 | 1.17 | 0.57 |
| Example 6-4 | 2.5 | 2.3 | 2.4 | 2.2 | 70.8 | 1.16 | 0.57 |
| Example 6-5 | 2.3 | 2.1 | 2.2 | 2 | 70.4 | 1.13 | 0.55 |

As apparent from Table 6, even the rectifying lattice having the vertical and horizontal partition walls with a sequentially increased pitch toward the central portion shows a high collision force.

Moreover, even a rectifying lattice as shown in FIG. 13 showed a high or improved collision force; wherein the rectifying lattice had a division wall structure which had a thickness of a partition wall of 0.5 mm, a total axial length of axially adjacent two partition walls of 20 mm, the number of vertical partition walls of n=4, and the number of horizontal partition walls of n+1=5, provided that the vertical and horizontal partition walls each had a sequentially decreased pitch toward a central portion, that is, the rectifying lattice established the relationship "Ph1<Ph2" and "Pv1<Pv2" in FIG. 13.

Comparative Example 1 (Rectifying Element with Radial 5-Blade Division Walls)

A rectifying member described in Patent Document 3 was used. Specifically, a first rectifying element equipped with five radial blades and a second rectifying element equipped with five radial blades were disposed in a rectifying flow path at an interval L2 of 5 mm with circumferentially displacing from each other at an angle of 36°. Each rectifying element has blades (thickness: 0.5 mm, axial length: 10 mm) with circumferentially equal intervals of a shaft member. The minimum flow path diameter was 4.9 mm in terms of an inscribed circle.

Comparative Example 2 (Rectifying Element with Radial 12-Blade Division Walls)

A nozzle described in Example 3 of Japanese Patent Application Laid-Open Publication No. 2011-115749 (JP 2011-115749 A) was used. The nozzle has a rectifying member equipped with 12 radial blades (thickness: 0.5 mm, axial length: 25 mm) with circumferentially equal intervals of a shaft member. The minimum flow path diameter was 3.1 mm in terms of an inscribed circle.

Comparative Example 3 (Two Rectifying Elements with Honeycomb-Shaped Division Wall Structure and with Narrow Flow Path Formed in Peripheral Division Wall Group)

A rectifying element with a honeycomb-shaped division wall structure shown in FIG. 2(*a*) of Patent Document 4 was used. Specifically, a rectifying element was prepared by forming a honeycomb-shaped division wall structure with an inscribed circle diameter of 2.5 mm in a cylindrical casing (inner diameter: 17 mm). The honeycomb-shaped division wall structure comprises an inside division wall group comprising: a regular-hexagonal division wall unit formed with partition walls (thickness: 0.5 mm, axial length: 10 mm) positioned in the central portion, and a plurality of regular-hexagonal division wall units adjacent circumferentially and radially to each partition wall (or division wall) of the central division wall unit (concretely, a configuration of the inside division wall group has five regular-hexagonal division wall units lined up in an X-axis direction). Two rectifying elements having such a structure were disposed with circumferentially displacing from each other at an angle of 90° with an interval L2 of 5 mm in the rectifying flow path. The minimum flow path diameter was 2.5 mm for the inside division wall group and 0.75 mm for a peripheral division wall group, in terms of the inscribed circle.

Reference Example 1 (Two Rectifying Elements with Honeycomb-Shaped Division Wall Structure and with Narrow Flow Path Formed in Peripheral Division Wall Group)

A collision force was evaluated in the same manner as in Comparative Example 3 except that the two rectifying elements having the structure of Comparative Example 3 were disposed in the rectifying flow path at an interval L2 of 5 mm without circumferential displacement.

Reference Example 2 (Single Rectifying Element with Honeycomb-Shaped Division Wall Structure and with Narrow Flow Path Formed in Peripheral Division Wall Group)

A single rectifying element similar to that in Comparative Example 3 was used except that a partition wall had an axial length of 20 mm. Specifically, a rectifying element was prepared by forming a honeycomb-shaped division wall structure with an inscribed circle diameter of 2.5 mm in a cylindrical casing (inner diameter: 17 mm). The honeycomb-shaped division wall structure comprises an inside division wall group comprising: a regular-hexagonal division wall unit formed with partition walls (thickness: 0.5 mm, axial length: 20 mm) positioned in the central portion, and a plurality of regular-hexagonal division wall units adjacent circumferentially and radially to each partition wall (or division wall) of the central division wall unit (concretely, a configuration of the inside division wall group has five regular-hexagonal division wall units lined up in an X-axis direction). The rectifying element having such a structure was disposed in a rectifying flow path. The minimum flow path diameter was 2.5 mm for the inside division wall group and 0.75 mm for a peripheral division wall group, in terms of the inscribed circle.

Example 7 (Non-Lattice Rectifying Element Having No Narrow Flow Path)

A nozzle performance was evaluated in the same manner as in Example 1 except that the following rectifying elements were used: a rectifying element having a division wall structure provided with a honeycomb structure and radial walls shown in FIG. 7 (Example 7-1); a rectifying element having a division wall structure provided with annular walls and radial walls shown in FIG. 8(*b*) (Example 7-2).

Example 7-1: Thickness of partition wall: 0.3 mm, Total axial length of axially adjacent two partition walls: 20 mm, Pitch: 2.8 mm, Opening area ratio: R=82.7%, Minimum flow path diameter (in terms of inscribed circle): Inside division wall group=2.5 mm, Peripheral division wall group=2.35 mm Example 7-2: Thickness of partition wall: 0.3 mm, Total axial length of axially adjacent two partition walls: 20 mm, Opening area ratio: R=84.4%, Minimum flow path diameter (in terms of inscribed circle conversion): Inside division wall group=2.17 mm, Peripheral division wall group=2.18 mm The rectifying element of Example 7-1 has a honeycomb-shaped division wall structure having an inside division wall group similar to that of Comparative Example 3, wherein the inside division wall group in Example 7-1 has a regular-hexagonal division wall unit with an inscribed circle diameter of 2.5 mm formed with partition walls (thickness: 0.3 mm, axial length: 10 mm) positioned in the central portion, and a plurality of regular-hexagonal division wall units adjacent circumferentially and radially to each partition wall of the central division wall unit to form a configuration in that five regular-hexagonal division wall units are lined up in an X-axis direction (a horizontal direction through an axis).

Example 8 (Rectifying Element with Annular Walls and Radial Walls)

A nozzle performance was evaluated in the same manner as in Example 1 except that the following rectifying elements were used: a rectifying element having a division wall structure shown in FIG. 9(*a*) (Example 8-1); a rectifying element having a division wall structure shown in FIG. 9(*b*) (Example 8-2); a rectifying element having a division wall structure shown in FIG. 9(*c*) (Example 8-3); a rectifying element having a division wall structure shown in FIG. 9(*d*) (Example 8-4); and a rectifying element having a division wall structure shown in FIG. 9(*e*) (Example 8-5). The rectifying elements were prepared by adjusting the thickness of the partition wall to 0.3 to 0.6 mm.

The following table shows the results of rectifying members of Comparative Examples 1 to 3, Reference Examples 1 to 2, Example 7 and Example 8. In the table, in the columns of the minimum flow path diameter and the opening area ratio of Comparative Example 3, Reference Examples 1 to 2, Example 7 and Example 8, one digit after the decimal point is shown as a significant digit. The minimum flow path diameter in the column shows each minimum flow path diameter from the central flow path of the inside division wall group to the flow path of the peripheral division wall, separated by slashes in order from left to right.

TABLE 7

| | Thickness of partition wall (mm) | Minimum flow path diameter (mm) | Opening area ratio R (%) | Collision force (MPa) H = 200 mm | Collision force (MPa) H = 300 mm |
|---|---|---|---|---|---|
| Comparative Example 1 | 0.5 | 4.9 | 60.7 | 0.86 | 0.56 |
| Comparative Example 2 | 0.5 | 3.1 | 77.3 | 0.98 | 0.59 |
| Comparative Example 3 | 0.5 | 2.5/2.5/2.5/0.8 | 70.3 | 1.04 | 0.62 |
| Reference Example 1 | 0.5 | 2.5/2.5/2.5/0.8 | 70.3 | 1.02 | 0.60 |
| Reference Example 2 | 0.5 | 2.5/2.5/2.5/0.8 | 70.3 | 1.01 | 0.60 |
| Example 7-1 | 0.3 | 2.5/2.5/2.5/2.4 | 82.7 | 1.13 | 0.65 |
| Example 7-2 | 0.3 | 2.2/2.2/2.2/2.2 | 84.4 | 1.14 | 0.66 |
| Example 8-1 | 0.5 | 2.3/3.6 | 80.3 | 1.12 | 0.64 |
| | 0.4 | 2.4/3.7 | 84.1 | 1.12 | 0.65 |
| | 0.3 | 2.5/3.8 | 87.9 | 1.10 | 0.63 |
| Example 8-2 | 0.6 | 2.0/2.2/2.5 | 77.6 | 1.08 | 0.60 |
| | 0.5 | 2.1/2.3/2.6 | 81.2 | 1.09 | 0.63 |
| | 0.4 | 2.2/2.4/2.6 | 84.8 | 1.11 | 0.63 |
| | 0.3 | 2.3/2.5/2.7 | 88.4 | 1.12 | 0.64 |
| Example 8-3 | 0.5 | 2.3/2.3/2.6 | 78.3 | 1.08 | 0.62 |
| | 0.4 | 2.4/2.4/2.6 | 82.4 | 1.11 | 0.64 |
| | 0.3 | 2.5/2.5/2.7 | 86.7 | 1.13 | 0.64 |
| Example 8-4 | 0.5 | 1.6/2.3/2.6 | 75.8 | 1.12 | 0.64 |
| | 0.4 | 1.7/2.4/2.6 | 80.4 | 1.14 | 0.66 |
| | 0.3 | 1.8/2.5/2.7 | 85.0 | 1.18 | 0.67 |
| Example 8-5 | 0.5 | 3.0/1.6/1.9/2.0 | 74.9 | 1.09 | 0.63 |
| | 0.4 | 3.1/1.7/2.0/2.1 | 79.6 | 1.11 | 0.64 |
| | 0.3 | 3.2/1.8/2.1/2.1 | 84.5 | 1.16 | 0.65 |

As apparent from the comparison of Comparative Examples (in particular, comparison with Comparative Example 3) with Example 7-1 in the table, even if an inside division wall group has a honeycomb-shaped division wall structure, the collision force is improved (or increased) by forming a division wall structure having radial walls and having no narrow flow path in a circumferential division wall structure.

Further, as apparent from the comparison of Comparative Examples (in particular, Comparative Examples 1 and 2) with Examples 7-2 and 8, even though a rectifying element has radial walls, the collision force is improved (or increased) by forming a division wall structure configured with a combination of one or more annular walls with radially extending radial walls from circumferentially different positions.

As apparent from the comparison of Comparative Example 3 with Reference Examples 1 to 2 having the same opening area ratio, the collision force is improved (or increased) by axially disposing a plurality of rectifying elements at interval(s) with circumferentially displacing the rectifying elements from each other (specifically, when the arrangement of the rectifying elements is viewed from the axial direction of the nozzle body, an intersection of division walls of one of the adjacent rectifying elements is positioned within a flow path unit defined with a division wall of the other rectifying element).

Furthermore, a nozzle performance was evaluated in the same manner as in Example 2 except that the evaluated rectifying element was a rectifying element (Example 8-4) provided with a division wall structure shown in FIG. 9(*d*) having 0.4 mm-thick partition wall. Specifically, the most downstream rectifying element (a first rectifying element) was installed in the rectifying flow path of the nozzle body with changing an angle of the partition wall (a circumferential displacement angle) with respect to the long axis of the orifice, and a second rectifying element was installed in the rectifying flow path of the nozzle body with an interval L2 of 5 mm relative to the first rectifying element. The second rectifying element was installed with circumferentially displacing the partition wall of the second rectifying element at an angle of 180° with respect to the partition wall of the first rectifying element. The results are shown in the table below.

TABLE 8

| | Angle to orifice (°) | Collision force (MPa) H = 200 mm | Collision force (MPa) H = 300 mm |
|---|---|---|---|
| Example 8-4 | 0 | 1.14 | 0.64 |
| | 10 | 1.12 | 0.65 |
| | 20 | 1.12 | 0.63 |

As shown in Table 8, the rectifying element having a non-lattice structure also shows a high collision force and a small anisotropy of a flow rate distribution relative to the long axis of the orifice, even though the angle of the partition wall relative to the long axis of the orifice is different.

[Relationship Between Opening Area Ratio and Collision Force in Examples]

The relationship between the opening area ratio R and the collision force (H=200 mm) in the above Examples is shown in FIG. 14.

As apparent from FIG. 14, when compared at the same opening area ratio, the rectifying lattices (Examples 1-3, 2-1 and 2-2) are more advantageous than the rectifying elements with a non-lattice division wall structure (Examples 8-1 to 8-5) in improving the collision force.

Example 9 (Filter Unit)

(1) Perforated Filter Unit

An industrial water was jetted for 8.5 seconds in the same manner as in Example 1 except that a filter unit shown in FIG. 2 [specifically, a filter unit having a large number of holes (hole diameter: 1.7 mmϕ, pitch: 2.7 mm) formed at a circumferential wall and a rear end wall thereof] and the rectifying element of Example 2-1 (minimum flow path diameter: minimum flow path diameter of peripheral division wall group=2.14 mm) were used. In the rectifying flow path, two rectifying elements of Example 2-1 were installed at an interval L2 of 5 mm with circumferential displacement from each other with an angle of 90°. The industrial water (15.7 L) contains 50 g of alumina particles (white alumina abrasive, particle size: #20, average particle diameter: 850 to 1180 μm).

The results showed that 44 particles adhered to the holes of the filter unit, and no clogging particle was observed in the rectifying element.

(2) Slit Filter Unit

The industrial water was jetted by in the same manner as in Example 9 (1) by using a filter unit having slit (slit-shaped) inflow holes (length: 15 mm, width: 1.5 mm, circumferential pitch: 30°) instead of the perforated filter unit and using the rectifying element of Example 1-3 (the number of horizontal partition walls: n=5, the number of vertical partition walls: n+1=6, having a narrow flow path, thickness of a partition wall: t=0.5 mm, minimum flow path diameter: minimum flow path diameter of peripheral division wall group=0.55 mm). Furthermore, the industrial water was jetted in the same manner as in the above Example 9 (1) except that the rectifying element of Example 2-1 (the number of horizontal partition walls: n=4, the number of vertical partition walls: n+1=5, having no narrow flow path, thickness of a partition wall: t=0.5 mm, minimum flow path diameter: minimum flow path diameter of peripheral division wall group=2.14 mm) was used instead of the rectifying element of Example 1-3.

The results showed that, in the nozzle provided with the rectifying element of Example 1-3, the slits of the filter unit were clogged with 3 alumina particles, and 18 clogging particles (alumina particles) in total were found in the division walls of the peripheral division wall groups of the first and second rectifying elements. In contrast, in the nozzle provided with the rectifying element of Example 2-1, the slit (slit-shaped) inflow portions of the filter unit were clogged with 4 alumina particles, and no clogged particle was observed in the peripheral division wall group or the inside division wall group. Thus, use of a rectifying lattice having no narrow flow path shown in Example 2-1 or the like allows prevention of clogging while increasing the collision force. FIG. 15 is a photograph showing a state of particle clogging in the rectifying element of Example 1-3, FIG. 15(*a*) shows the downstream first rectifying element, and FIG. 15(*b*) shows the upstream second rectifying element.

From these results, for the rectifying element having a division wall structure, it is advantageous to use the perforated filter unit having inflow holes smaller than the minimum flow path diameter of the rectifying element compared with the slit filter unit. In addition, use of the rectifying element having no narrow flow path effectively prevents clogging due to foreign matters or impurities.

INDUSTRIAL APPLICABILITY

The rectifying member and the nozzle according to the present invention can be used for various spray nozzles, for example, a cooling nozzle, a cleaning nozzle, a humidity-controlling nozzle, a drying nozzle, and a chemical-spraying nozzle. The rectifying member and the nozzle are preferably used or applied for a nozzle for which a high-density jetting of a fluid is desired (for example, a high-pressure nozzle capable of removing or peeling off a deposit, a coating layer, or others on a base material), and are particularly used or applied for a descaling nozzle.

REFERENCE SIGNS LIST

1 . . . Fluid flow path
2 . . . Entering flow path
3 . . . Filter element
5 . . . Nozzle body
6 . . . Rectifying flow path
11 . . . Rectifying member
11*a*, 11*b* . . . Rectifying element
12 . . . Casing
13 . . . Lattice structure (Partition wall structure)
14, 34*a* to 34*f*, 44*a* to 44*c*, 84*a*, 84*b*, 94*a*, 94*b* . . . Vertical partition wall (Vertical division wall)
15, 35*a* to 35*f*, 45*a* to 45*c*, 85*a*, 85*b*, 95*a* to 95*c* . . . Horizontal partition wall (Horizontal division wall)
16*a*, 16*b*, 56 . . . Division wall unit
17, 37*a* to 37*d*, 57, 67*a*, 67*b* . . . Extending partition wall
18 . . . Peripheral division wall group
19 . . . Inside division wall group
26 . . . Jet flow path
28 . . . Orifice (Discharge port)
30 . . . Nozzle case
61*a* to 63*a*, 61*b* to 63*b* . . . Annular wall
65*a*, 66*a*, 64*b* to 66*b* . . . Radial wall

The invention claimed is:

1. A rectifying member which is disposed in a fluid flow path extending in an axial direction of a nozzle body and divides the fluid flow path into a plurality of flow path units, wherein the rectifying member comprises a plurality of rectifying elements capable of being disposed or installed adjacently in an axial direction of the fluid flow path, the rectifying elements each comprise a tubular casing capable of being installed in the nozzle body and a lattice or non-lattice division wall structure being formed in the casing and having an axially extending division wall, the division wall structure comprises a circumferential division wall group being adjacent in a circumferential direction of an inner wall of the casing, to configure a circumferential flow path unit group at a circumferential region of the fluid flow path and an inside division wall group being adjacent to the circumferential division wall group, to configure an inside flow path unit group at an inside region of the fluid flow path, the circumferential division wall group and the inside division wall group have the following configuration (1) and/or (2):

(1)

(1-1) in the lattice division wall structure, as viewed from the axial direction, in the axially adjacent rectifying elements, an intersection of division wall units of an inside division wall group of one rectifying element is positioned within a flow path unit defined with a division wall unit of an inside division wall group of another rectifying element, and (1-2) in the non-lattice division wall structure, as viewed from the axial direction, in the axially adjacent rectifying elements, an intersection of division wall units of an inside division wall group of one rectifying element and/or a division wall is positioned within a flow path unit defined with a division wall unit of an inside division wall group of another rectifying element, (2) the inside division wall group contains regularly arranged or disposed division wall units, and the circumferential division wall group has no narrow flow path in association with the inner wall of the casing, and wherein the lattice division wall structure comprises the circumferential division wall group and the inside division wall group which have the following division wall group (a), and the non-lattice division wall structure comprises the circumferential division wall group and the inside division wall group which have the following division wall group (b) or (c);

(a) a division wall group comprising at least an inside division wall group which has a lattice or grid division walls formed of partition walls extending in vertical and horizontal directions, (b) a division wall group comprising a plurality of polygonal-shaped division walls being adjacent to each other to form a polygonal-shaped inside flow path unit group, and a plurality of extending partition walls traversing the plurality of polygonal-shaped division walls in a radial direction or extending from circumferential walls of the polygonal-shaped division walls in the radial direction to reach the inner wall of the casing, (c) a division wall group comprising one or more concentric polygonal-shaped or concentric ring-shaped annular walls, provided that, for a division wall structure comprising one annular wall, the inner wall of the casing is regarded as an annular wall, a plurality of intermediate radial walls which radially extend from circumferentially different positions, to connect the annular walls radially adjacent to each other, and a plurality of extending partition walls radially extending from an outermost annular wall, at positions circumferentially different from the intermediate radial walls, to reach the inner wall of the casing.

2. The rectifying member according to claim 1, wherein the division wall group (a) comprises a division wall group comprising at least an inside division wall group which has a lattice or grid division walls including plural vertical partition walls extending in the vertical direction to divide a fluid flow path with a predetermined pitch in the X-axis direction as the horizontal direction, and plural horizontal partition walls extending in the horizontal direction to divide the fluid flow path with a predetermined pitch in the Y-axis direction as the vertical direction;

the division wall group (b) comprises a division wall group comprising a plurality of polygonal-shaped division walls being adjacent to each other to form a polygonal-shaped inside flow path unit group and a plurality of extending partition walls traversing the plurality of polygonal-shaped division walls in a radial direction or regularly extending from middle portions and/or vertex portions of the partition walls of the polygonal division walls in the radial direction to reach the inner wall of the casing;

and the division wall group (c) comprises a division wall group comprising one or more concentric ring-shaped annular walls, provided that, for a division wall structure comprising one annular wall, the inner wall of the casing is regarded as an annular wall, a plurality of intermediate radial walls which radially extend from circumferentially different positions, to connect the annular walls radially adjacent to each other, and a plurality of extending partition walls radially extending from an outermost annular wall, at positions circumferentially different from the intermediate radial walls, to reach the inner wall of the casing.

3. The rectifying member according to claim 1, wherein the plurality of rectifying elements each have a lattice division wall structure comprising a plurality of horizontal partition walls extending in an X-axis direction as a horizontal direction to divide the fluid flow path with a predetermined pitch in a Y-axis direction as a vertical direction and a plurality of vertical partition walls extending in the Y-axis direction as the vertical direction to divide the fluid flow path with a predetermined pitch in the X-axis direction as the horizontal direction, (a-1) the horizontal partition walls and the vertical partition walls have a different number of partition walls from each other and are disposed with the same or a different pitch from each other, or (a-2) densities of the horizontal partition walls and the vertical partition walls are higher in a central region of the fluid flow path, and the horizontal partition walls and the vertical partition walls have the same or a different number of partition walls, and the division wall structure is symmetrical with respect to the X-axis or the Y-axis as a central axis.

4. The rectifying member according to claim 1, wherein the division wall structures of the rectifying elements each have a lattice division wall structure comprising a plurality of horizontal partition walls extending in an X-axis direction as a horizontal direction to divide the fluid flow path with a predetermined pitch in a Y-axis direction as a vertical direction and a plurality of vertical partition walls extending in the Y-axis direction as the vertical direction to divide the fluid flow path with a predetermined pitch in the X-axis direction as the horizontal direction, the horizontal partition walls and the vertical partition walls are formed in a relation that the number of either one of these partition walls is n and the number of the other partition walls is n+1, where n denotes an integer of 2 to 8; of the horizontal partition walls and the vertical partition walls, the partition walls with an even number of partition walls are arranged to avoid a central portion of a cylindrical fluid flow path; and a central partition wall of the partition walls with an odd number of partition walls is arranged to traverse a central portion of the casing.

5. The rectifying member according to claim 1, wherein the circumferential division wall group comprises a peripheral division wall group which comprises a plurality of circumferentially adjacent division wall units contacting with the inner wall of the casing;

the inside division wall group contains a plurality of division wall units being adjacent to each other and being regularly arranged or disposed with a predetermined pitch;

the peripheral division wall group comprises a plurality of extending partition walls extending from the plurality of division wall units of the inside division wall group to reach the inner wall of the casing to form division wall units in association with the inner wall of the casing;

(5-1) among the plurality of horizontal partition walls and vertical partition walls in the peripheral division wall group, at least one end of at least one partition wall close to or facing the inner wall of the casing is connected or joined to the other partition wall without reaching the inner wall of the casing, and/or (5-2) among the plurality of extending partition walls, an extending partition wall having a short length to the inner wall of the casing is absent.

6. The rectifying member according to claim 1, wherein the rectifying elements each have a lattice division wall structure which comprises a plurality of vertical partition walls and a plurality of horizontal partition walls to divide the fluid flow path with a predetermined pitch in a horizontal direction and a vertical direction, respectively;

the horizontal partition walls and the vertical partition walls are formed in a relation that the number of either one of these partition walls is n and the number of the other partition walls is n+1, where n denotes an integer of 3 to 6; the partition walls with an even number of partition walls are arranged to avoid a central portion of a cylindrical fluid flow path; and a central partition wall of the partition walls with an odd number of partition walls is arranged to traverse a central portion of the casing;

among the partition walls with an even number of partition walls and/or the partition walls with an odd number of partition walls, a partition wall at least positioned in a central region reaches the inner wall of the casing, and a partition wall positioned in a side or peripheral region has both ends each connected or joined to an intersecting partition wall without reaching the inner wall of the casing.

7. The rectifying member according to claim 1, wherein the circumferential division wall group comprises a plurality of circumferentially adjacent peripheral division walls contacting with the inner wall of the casing;

the inside division wall group comprises a plurality of division wall units being adjacent to each other with a predetermined pitch, and the division wall units are regularly arranged or disposed symmetrically with an X-axis of a horizontal direction or a Y-axis of a vertical direction as a central axis;

the plurality of rectifying elements is capable of being disposed in the fluid flow path in the following configuration (7-1) or (7-2):

(7-1) the rectifying elements are capable of being disposed in the fluid flow path with circumferential displacement from each other, (7-2) when the X-axis or the Y-axis is defined as a reference axis, the rectifying elements are capable of being disposed in the fluid flow path with circumferential displacement of the reference axis of one rectifying element at an angle of 15 to 180° with respect to the reference axis of another rectifying element.

8. The rectifying member according to claim 1, wherein the inside division wall group of each of the rectifying elements has a lattice division wall structure formed with division walls extending in vertical and horizontal directions with a predetermined pitch, as viewed from the axial direction of the nozzle body, in the adjacent rectifying elements, the rectifying elements are capable of being disposed in a configuration in which an intersection of division walls of one rectifying element is positioned within a central region of a flow path unit defined with a division wall of another rectifying element.

9. The rectifying member according to claim 1, which has at least one characteristic selected from the following (9-1), (9-2), and (9-3):

(9-1) a minimum flow path diameter of flow path diameters defined with the division walls of the circumferential division wall group is 50% or more with respect to a minimum flow path diameter of flow path diameters defined with the division walls of the inside division wall group, (9-2) the rectifying elements have an opening area ratio R of 60 to 93%, (9-3) the equation L/P=3 to 15 is satisfied, wherein P represents a pitch of partition walls being adjacent to each other in an X-axis direction and a Y-axis direction of the fluid flow path, and L represents a total axial length of axially adjacent partition walls.

10. The rectifying member according to claim 1, wherein the rectifying elements, which are capable of being axially adjacently disposed, are capable of being circumferentially positioned to each other.

11. A rectifying element which is capable of being disposed or installed in each of sites adjacent to each other in an axial direction of a fluid flow path of a nozzle body, the rectifying elements being adjacent to each other and being circumferentially displaced from each other, and wherein the rectifying element comprises a cylindrical casing and a division wall structure, recited in claim 1, disposed in the casing.

12. A nozzle comprising a nozzle body having a fluid flow path and a rectifying member, recited in claim 1, disposed in the fluid flow path of the nozzle body.

13. The nozzle according to claim 12, wherein the nozzle body forms a nozzle body of a descaling nozzle, and the descaling nozzle body comprises an entering flow path capable of entering a fluid into the nozzle body through a filter, a rectifying flow path which is positioned downstream of the entering flow path and in which the rectifying member is capable of being disposed, an intermediate flow path extending in a downstream direction from the rectifying flow path, and a jet flow path jettable the fluid, which passed through the intermediate flow path, from an orifice having a long and narrow or oval shape.

14. The nozzle according to claim 12, wherein the nozzle body comprises one or more tubes comprising a tube in which the rectifying member is capable of being disposed and which has a filter element attached thereto, and the filter element has at least a circumferential wall having scattered inflow holes and/or a plurality of axially extending slit-shaped inflow holes at intervals in a circumferential direction.

15. The nozzle according to claim 12, wherein a rectifying element positioned at the most downstream comprises partition walls extending in vertical and horizontal directions, a circumferential direction, and/or radial directions, and the rectifying element positioned at the most downstream is disposed in a rectifying flow path in a configuration in which the partition walls are oriented at an angle of 0 to 90° with respect to a long axis direction of an orifice having a long and narrow or oval shape.

16. The rectifying member according to claim 1, wherein the inside division wall group comprises a plurality of hexagonal division walls adjacent in the circumferential direction and the radial direction, and the circumferential division wall group comprises a plurality of extending partition walls extending from circumferential walls of the hexagonal division walls in the radial direction to reach the inner wall of the casing.

17. The rectifying member according to claim 1, wherein the circumferential division wall group and the inside division wall group comprise a division wall group comprising one or more concentric ring-shaped annular walls, provided that, for a division wall structure comprising one annular wall, the inner wall of the casing is regarded as an annular wall, a plurality of intermediate radial walls which radially extend from circumferentially different positions, to connect the annular walls radially adjacent to each other, and a plurality of extending partition walls radially extending from an outermost annular wall, at positions circumferentially different from the intermediate radial walls, to reach the inner wall of the casing, and the partition walls of the division wall group each have a thickness of 0.1 to 1 mm.

18. The rectifying member according to claim 1, which is disposed in a nozzle which has an orifice having a long and narrow or oval shape, wherein the rectifying member comprises a plurality of rectifying elements capable of being disposed or installed adjacently in an axial direction of the fluid flow path extending in an axial direction of a nozzle body, a rectifying element positioned at the most downstream comprises partition walls extending in vertical and horizontal directions, a circumferential direction, and/or radial directions, and the rectifying element positioned at the most downstream is disposed in a rectifying flow path in a configuration in which the partition walls are oriented at an angle of 0 to 90° with respect to a long axis direction of the orifice.

* * * * *